US012794940B2

(12) United States Patent
Kurian et al.

(10) Patent No.: US 12,794,940 B2
(45) Date of Patent: Nov. 10, 2026

(54) DYNAMIC QUANTUM-ENHANCED NETWORK SECURITY SYSTEM WITH GENERATIVE AI AND SIMULATION

(71) Applicant: Bank of America Corporation, Charlotte, NC (US)

(72) Inventors: Manu Kurian, Dallas, TX (US); Aeric Solow, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/085,138

(22) Filed: Mar. 20, 2025

(65) Prior Publication Data

US 2026/0291984 A1 Sep. 24, 2026

(51) Int. Cl.

| | |
|---|---|
| ***H04L 9/40*** | (2022.01) |
| ***H04L 9/08*** | (2006.01) |
| ***H04L 41/16*** | (2022.01) |

(52) U.S. Cl.

CPC ........ *H04L 63/1458* (2013.01); *H04L 9/0852* (2013.01); *H04L 41/16* (2013.01); *H04L 63/0236* (2013.01); *H04L 63/1491* (2013.01)

(58) Field of Classification Search

CPC ... H04L 63/1458; H04L 41/16; H04L 9/0852; H04L 63/0236; H04L 63/1491

See application file for complete search history.

(56) References Cited

U.S. PATENT DOCUMENTS

| | | | | |
|---|---|---|---|---|
| 8,161,049 | B2 | 4/2012 | Williams | |
| 10,044,638 | B2 | 8/2018 | Dadashikelayeh et al. | |
| 2006/0179029 | A1 | 8/2006 | Vala et al. | |
| 2013/0251145 | A1 | 9/2013 | Lowans et al. | |
| 2022/0215141 | A1 | 7/2022 | Gutierrez et al. | |
| 2025/0258685 | A1 * | 8/2025 | Crabtree | A63F 13/40 |
| 2025/0291896 | A1 * | 9/2025 | Lang, Sr. | G06F 21/54 |

* cited by examiner

*Primary Examiner* — Benjamin A Kaplan

(74) *Attorney, Agent, or Firm* — Banner & Witcoff, Ltd.

(57) ABSTRACT

A network security system and method integrate generative artificial intelligence, dynamic firewall management, quantum processing, simulation, and quantum key distribution to protect digital infrastructure. The generative AI scans internet data to identify malicious URLs, generating dynamic deny and allow lists for a firewall that updates rules in real time, monitors traffic, and mitigates DDoS attacks. A quantum firewall inspects packets using a quantum processor, producing prioritized quantum rules, while a doppelganger system simulates packet effects on a mirrored network with a quantum simulator, preemptively determining outcomes. Quantum key distribution employs photon polarization to generate keys, validating traffic and detecting eavesdropping, with the firewall rerouting traffic and adjusting update frequency based on threat levels. Historical traffic analysis predicts threats, and internal communications are encrypted, ensuring comprehensive, adaptive security through interconnected components managed by a central network manager.

20 Claims, 4 Drawing Sheets

Sample Flow Diagram

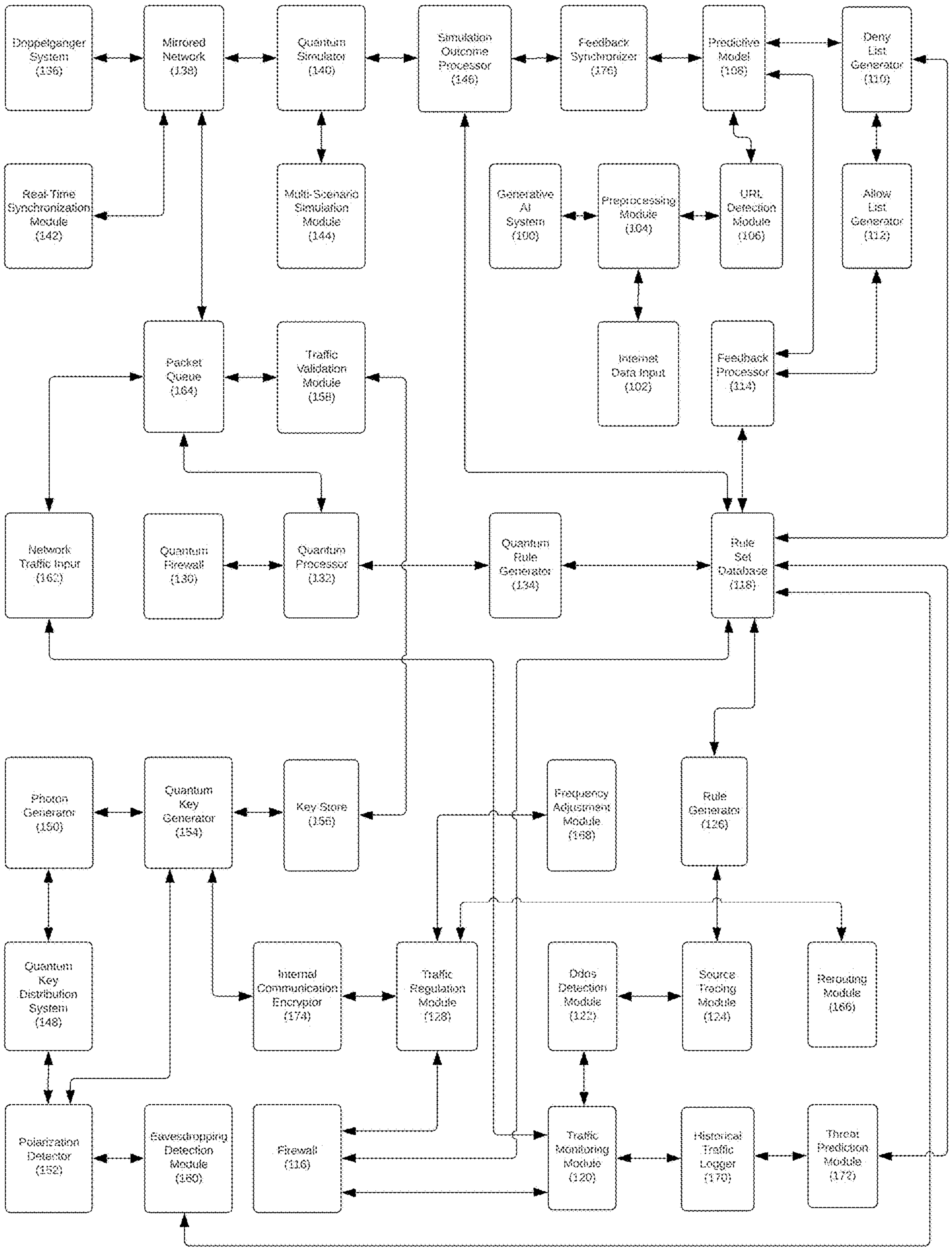
FIG. 1: Sample Flow Diagram

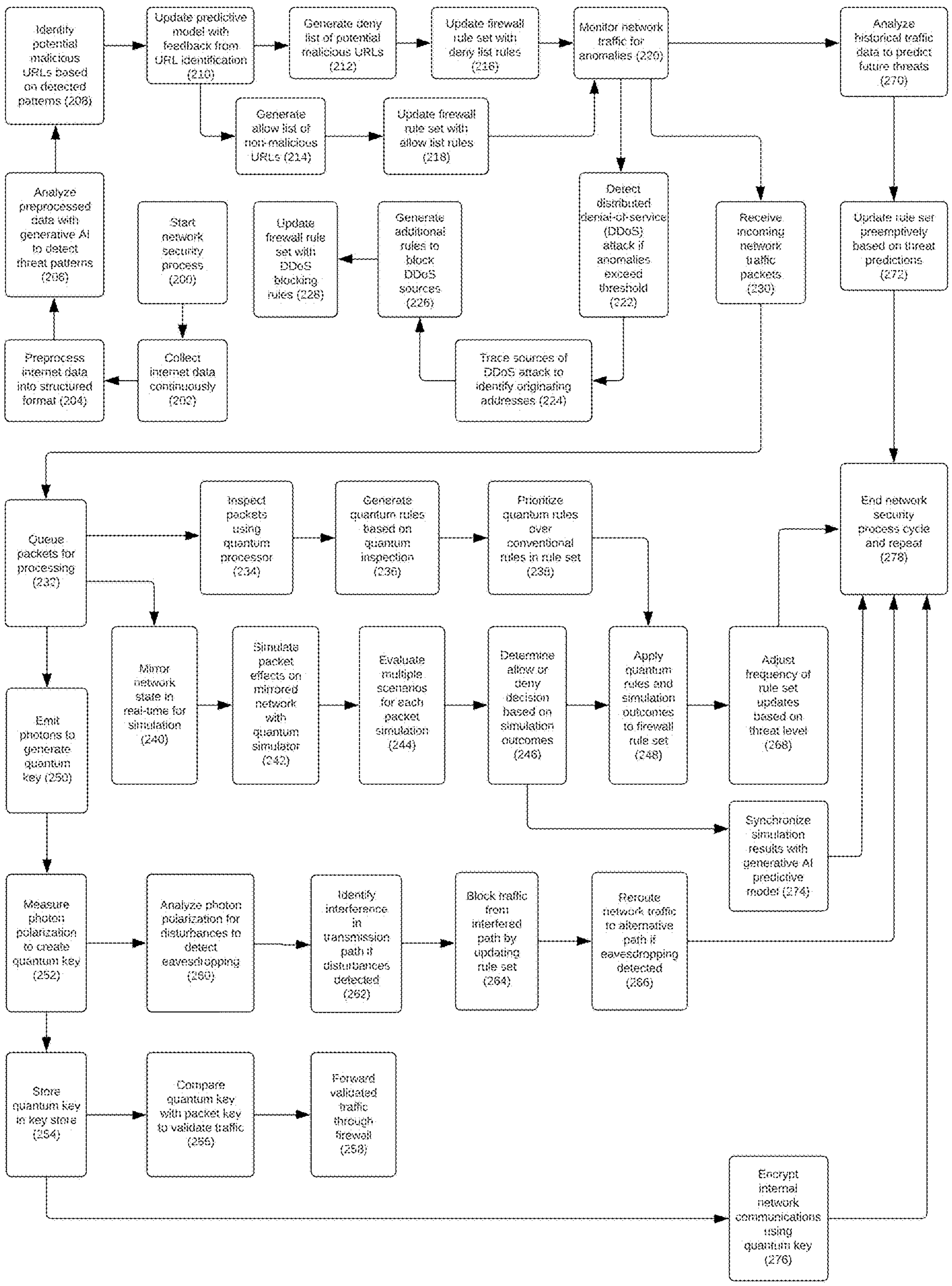
FIG. 2: Sample Flow Diagram

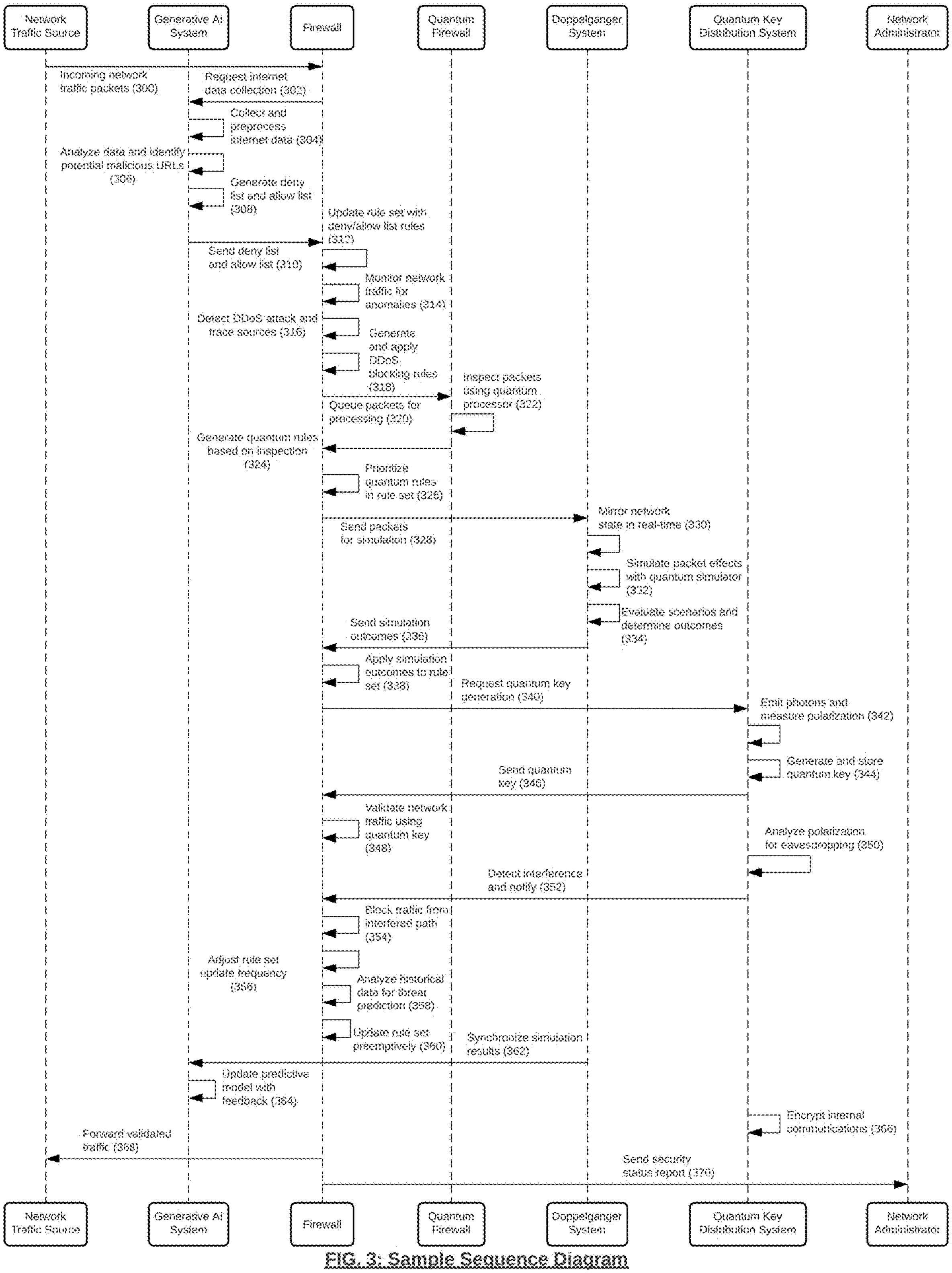
FIG. 3: Sample Sequence Diagram

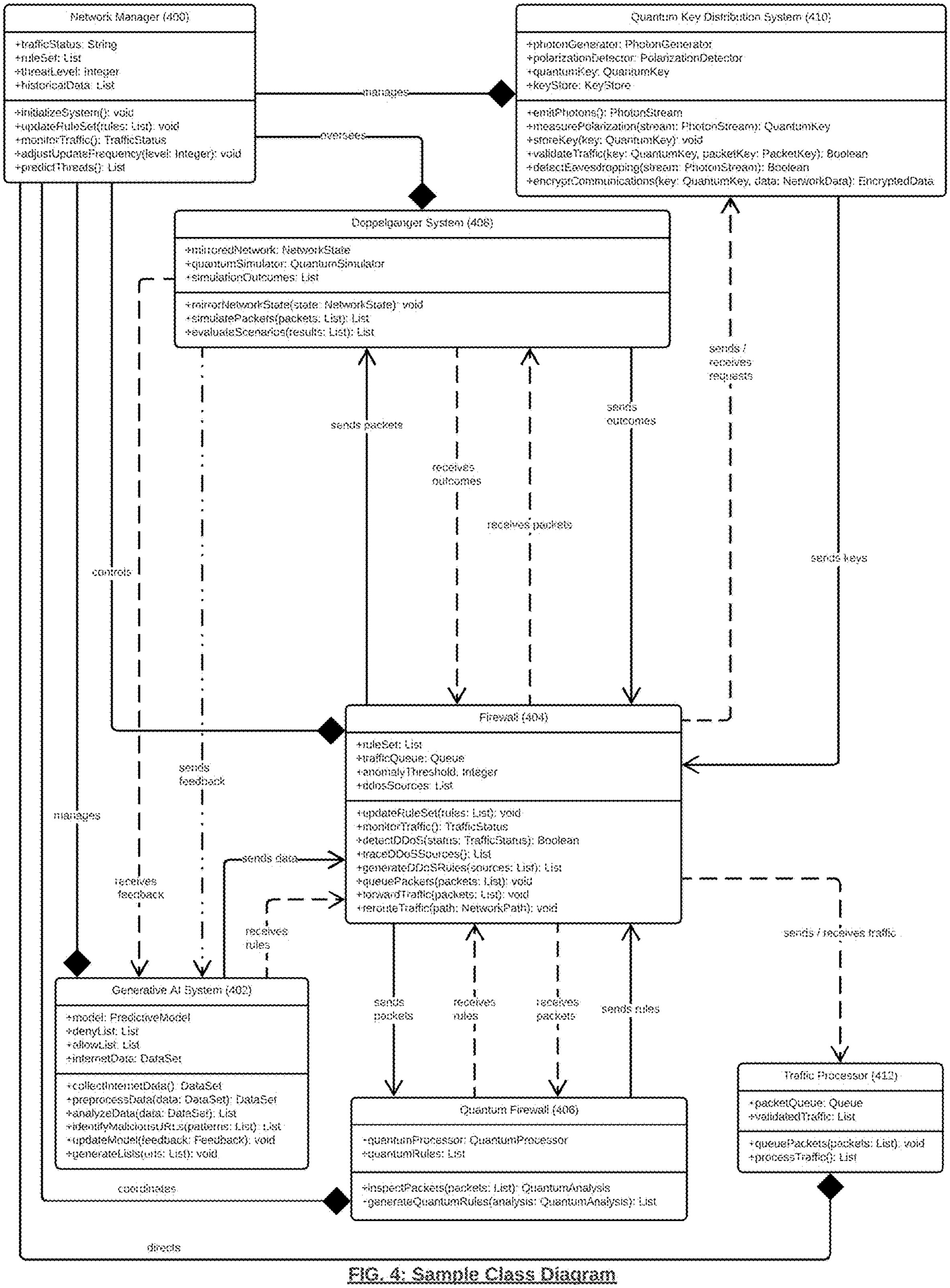
FIG. 4: Sample Class Diagram

DYNAMIC QUANTUM-ENHANCED NETWORK SECURITY SYSTEM WITH GENERATIVE AI AND SIMULATION

TECHNICAL FIELD

The inventions disclosed herein pertain to multiple technical fields and involve technologies directed to protecting information processed, stored, or transmitted by computers and networks from unauthorized access, use, disclosure, disruption, modification, or destruction, utilizing a generative AI to scan for potential malicious URLs, dynamically update firewall rules, and monitor internet traffic for distributed denial-of-service attacks, with enhancements from quantum firewall integration and a duplicate doppelganger system for simulating responses to threats. It also encompasses digital data processing systems or methods that provide support functions, such as system configuration and security management, through the use of AI-driven dynamic rules and quantum computing to generate and inspect packets for secure data handling. Additionally, the invention relates to equipment and processes that obscure information or ensure its authenticity, integrity, or confidentiality, leveraging quantum computing for a quantum public key and photon polarization for secure key distribution to validate data exchanges and detect eavesdropping. Finally, it pertains to the simultaneous transmission of multiple information signals over a common medium, managing network communications by scanning traffic, identifying threats, and adjusting data flow to maintain secure and efficient transmission.

DESCRIPTION OF THE RELATED ART

In today's interconnected digital landscape, maintaining strong network security poses an increasingly complex challenge as cyber threats evolve rapidly. Traditional approaches to securing networks rely heavily on static configurations that require human intervention to identify and mitigate potential risks. These manual processes often involve painstaking efforts to catalog and evaluate domains or sources that could harbor harmful intent, a task that becomes overwhelming given the sheer volume of online activity at any moment. The constant influx of new domains and the shifting tactics used by adversaries mean that security measures can quickly become outdated, leaving systems exposed to attack before updates can be implemented.

The reliance on human-driven updates creates a significant lag between the emergence of a threat and the deployment of a countermeasure. During this delay, networks remain vulnerable to incursions that can disrupt operations, compromise sensitive information, or degrade system performance. This reactive posture is problematic in environments where real-time data exchange is essential, such as financial institutions, government agencies, or large-scale online services, where even brief windows of exposure can lead to substantial consequences. The manual nature of these updates also demands considerable resources, diverting skilled staff from other pressing tasks to focus on repetitive and time-consuming maintenance.

Another pressing issue comes from the limited scope of conventional security tools in analyzing the content they encounter. Many existing systems focus primarily on surface-level indicators, such as IP addresses or predefined patterns, without digging into the deeper context of the data passing through them. This superficial inspection often fails to detect sophisticated threats that disguise themselves within legitimate traffic. As adversaries employ more advanced techniques to obscure their actions, the inability to scrutinize content comprehensively leaves networks susceptible to breaches that evade traditional detection methods.

The growing prevalence of distributed denial-of-service (DDoS) attacks further exacerbates these challenges. These coordinated efforts overwhelm systems by flooding them with excessive traffic, rendering services inaccessible and disrupting normal operations. Identifying the origins of such attacks in real time is a daunting task for conventional tools, which often lack the capability to trace sources quickly amid the chaos of an ongoing assault. This delay in pinpointing the root of the problem lets the disruption persist, amplifying the impact on affected systems and their users.

The static nature of current security configurations struggles to adapt to the dynamic environment of modern networks. Threats do not adhere to predictable schedules or patterns; they emerge and evolve unpredictably, often attacking the rigidity of pre-set rules. Systems that depend on fixed lists of approved or denied entities cannot keep pace with the rapid creation of new domains or the repurposing of existing ones for malicious purposes. This inflexibility creates gaps that can be attacked before manual updates can close them, perpetuating a cycle of vulnerability.

The computational demands of analyzing vast amounts of network traffic in real time present another hurdle. Traditional systems often lack the processing power to evaluate every packet comprehensively without introducing latency that degrades user experience. Security measures may focus on speed over thoroughness, letting subtle threats slip through undetected. This trade-off between performance and protection undermines the reliability of networks, particularly in high-stakes scenarios where both efficiency and safety are non-negotiable.

Encryption and secure communication also face mounting difficulties in this landscape. Conventional methods for validating data exchanges rely on established cryptographic techniques that, while effective, are increasingly tested by advances in computing power. The potential for interception or tampering during transmission remains a concern, especially as adversaries develop more sophisticated tools to eavesdrop on or manipulate network communications. Ensuring the integrity and confidentiality of data as it moves through a system is a persistent challenge that existing approaches struggle to address comprehensively.

The unpredictability of how a system will respond to incoming data compounds these issues. Without the ability to expect the outcome of processing a packet, security tools must decide based on incomplete information. This uncertainty can lead to either overly permissive actions that allow harmful content through or overly restrictive measures that block legitimate traffic, both of which disrupt the intended functionality of the network. The lack of foresight into system behavior under varying conditions leaves administrators grappling with a trial-and-error approach to threat management.

Network administrators also face difficulties in detecting interference along communication lines. Subtle attempts to track or change data in transit can go unnoticed by systems that lack the sensitivity to identify such intrusions. This blind spot lets unauthorized parties gather information or influence operations without triggering alarms, undermining trust in the security framework. The absence of mechanisms to flag these activities in real time perpetuates a state of vulnerability that is difficult to rectify with current tools.

The scalability of security measures is another area of concern. As organizations expand their digital footprint, the volume of traffic and the complexity of their networks grow exponentially. Traditional solutions often struggle to adapt to this scale, requiring significant reconfiguration or more resources to maintain effectiveness. This lack of scalability can lead to inconsistent protection across different segments of a network, creating weak points that can be targeted by determined adversaries.

Integrating emerging technologies into existing security frameworks poses its own set of problems. As networks incorporate new tools and protocols, compatibility issues can arise, weakening the overall defensive posture. Systems that cannot seamlessly adapt to these advancements risk becoming obsolete or introducing unforeseen vulnerabilities. This fragmentation complicates efforts to maintain a cohesive and resilient security strategy across diverse technological environments.

The sheer speed at which threats propagate across the internet adds further urgency to these challenges. A single point of entry can quickly escalate into a widespread compromise if not addressed promptly. Conventional approaches, with their reliance on manual intervention and static rules, are ill-equipped to match this pace, letting threats spread before containment measures can be enacted. This rapid escalation underscores the need for a more proactive and responsive approach to network protection.

Resource constraints also play a significant role in hindering effective security. Organizations must balance the cost of implementing and maintaining strong defenses with other operational priorities. The labor-intensive nature of updating and tracking traditional systems often strains budgets and staff, leading to compromises in coverage or frequency of updates. This tension between cost and security leaves many networks operating with less-than-optimal safeguards.

The complexity of modern threats demands a level of sophistication that outstrips the capabilities of many existing solutions. Adversaries leverage advanced techniques that blend seamlessly into normal traffic, making them difficult to isolate without disrupting legitimate activity. The inability to distinguish between benign and harmful elements with precision results in either missed threats or unnecessary interruptions, both of which erode the effectiveness of the security apparatus.

For years, the field of network security has grappled with a long-felt and unmet need for a solution that can address these multifaceted problems comprehensively. The reliance on manual processes, static configurations, and limited analytical capabilities has left systems perpetually one step behind the evolving threat landscape. Organizations have sought a way to expect and neutralize risks in real time, adapt dynamically to new challenges, and ensure secure communication without sacrificing performance, yet existing tools have consistently fallen short of delivering a holistic and forward-thinking approach to these persistent issues.

SUMMARY OF THE INVENTION

The invention is a sophisticated network security system that leverages advanced computational techniques to protect digital infrastructure. At its core, it employs a generative artificial intelligence (AI) component designed to continuously scan the internet for domains or sources that could pose risks to a network. This AI system analyzes patterns and characteristics of online entities, generating lists of potentially harmful URLs on the fly. These lists are then integrated into a firewall, enabling the system to dynamically adjust its rules without requiring manual input, ensuring that the network remains shielded from emerging threats as they are identified.

Complementing the generative AI, the system incorporates a robust firewall mechanism that operates in real time. This firewall uses the AI-generated lists to permit or block traffic based on the latest intelligence gathered from internet scans. By updating its rules dynamically, the firewall can respond to new domains or sources almost instantaneously, providing a proactive layer of defense. This adaptability allows the system to maintain security even as the digital landscape shifts, addressing the rapid creation and repurposing of online entities that traditional static firewalls struggle to manage.

A distinctive feature of this invention is its ability to monitor network traffic for large-scale disruptions, such as distributed denial-of-service (DDoS) attacks. The system analyzes incoming data streams to detect unusual patterns indicative of such assaults, which aim to overwhelm and incapacitate networks. Upon identifying a potential attack, it traces the origins of the disruptive traffic, pinpointing the sources responsible. This capability enables the system to generate targeted firewall rules to mitigate the attack, neutralizing the threat by blocking traffic from the identified points of origin.

The invention also introduces an optional quantum firewall component, which can either replace the conventional firewall or be layered atop it. This quantum firewall leverages the principles of quantum computing to enhance security measures. By utilizing quantum-based processing, it can perform complex analyses of network traffic at unprecedented speeds, allowing for more thorough inspections of data packets. This quantum integration enables the creation of firewall rules that are not only dynamic but also informed by advanced computational power, elevating the system's ability to detect and respond to intricate threats.

One of the most innovative aspects of this system is its duplicate doppelganger mechanism. This feature involves a parallel simulation environment that mirrors the primary network system. Before any data packet is processed by the actual network, it is first routed through this doppelganger system. Here, the packet's potential impact is evaluated, and the system simulates how the network would respond if the packet were allowed to proceed. This preemptive analysis provides a virtual testbed, allowing the system to assess outcomes without risking the integrity of the live network.

The doppelganger system relies heavily on quantum computing to execute these simulations efficiently. Quantum processors enable rapid modeling of complex scenarios, evaluating multiple variables and potential consequences in a fraction of the time required by classical computing methods. If the simulation indicates that a packet could cause harm—such as triggering a malfunction or allowing unauthorized access—the system generates a rule to block it before it reaches the primary network. Conversely, if the outcome appears benign, the packet is permitted to pass through, ensuring seamless operation without unnecessary interruptions.

This simulation capability extends beyond individual packets to broader network behaviors. The doppelganger system can model how the network might react to sustained traffic patterns or coordinated attacks, providing insights into vulnerabilities that might not be apparent in real-time monitoring alone. By anticipating these scenarios, the system can proactively adjust its defenses, closing potential entry points before they are attacked. This forward-looking approach marks a significant departure from reactive security measures that only address threats after they manifest.

The invention further enhances security through advanced cryptographic techniques integrated into its quantum framework. It explores the use of quantum public keys for validating data exchanges as they pass through the firewall. Unlike traditional cryptographic methods, which rely on mathematical complexity, this approach utilizes quantum properties to secure communications. The system generates these keys using quantum computing resources, ensuring a high level of robustness against attempts to crack or replicate them.

A key element of this cryptographic enhancement is the use of photon polarization for quantum key distribution. Photon polarization involves encoding information into the quantum states of light particles, which are then transmitted between the system and external entities. This method ensures that the keys used to authenticate traffic are both secure and unique, as any attempt to intercept or measure the photons would alter their state, disrupting the communication. This quantum-based validation provides a reliable means of confirming the legitimacy of incoming data.

The system's reliance on photon polarization also offers a mechanism for detecting interference in network communications. Because any eavesdropping attempt would disturb the polarized photons, the system can identify the presence of unauthorized monitoring along the transmission path. Upon detecting such disturbances, it can take immediate action, such as closing specific ports or rerouting traffic to prevent further intrusion. This sensitivity to tampering adds an additional layer of protection, safeguarding the network from subtle threats that might otherwise go unnoticed.

The generative AI component is designed to operate continuously, scanning the internet beyond the immediate network it protects. It collects data from a wide range of sources, analyzing trends and emerging patterns that could indicate new risks. This broad surveillance allows the system to stay ahead of threats, incorporating global intelligence into its local firewall rules. The AI's ability to learn and adapt over time ensures that its threat detection improves with experience, refining its criteria for identifying suspicious domains.

Integration of quantum computing into the firewall and simulation processes enables the system to handle the immense computational load required for real-time analysis and modeling. Quantum processors excel at solving problems with multiple variables and probabilistic outcomes, making them ideal for evaluating the vast datasets generated by network traffic. This power allows the system to maintain performance without sacrificing the depth of its security checks, addressing the trade-offs that often plague conventional solutions.

The invention's architecture is modular, allowing for flexibility in deployment. Organizations can choose to implement the generative AI and dynamic firewall without the quantum components, or they can opt for the full suite, including the quantum firewall and doppelganger system. This scalability ensures that the system can be tailored to the needs and resources of different networks, from small enterprises to large-scale operations. The modular design also facilitates future upgrades as technology advances, keeping the system relevant over time.

The doppelganger system's simulation capabilities are not limited to immediate threat assessment. It can also be used for testing network configurations or updates before they are applied to the live environment. By running these changes through the duplicate system, administrators can identify potential issues or weaknesses without risking operational stability. This feature provides a valuable tool for maintaining and optimizing network performance alongside security.

The quantum firewall's ability to generate rules based on packet inspection goes beyond simple allow-or-deny decisions. It can create nuanced policies that adjust traffic flow based on context, such as prioritizing certain types of data during high-risk periods or rerouting suspicious packets for further analysis. This granularity enhances the system's effectiveness, allowing it to balance security with operational efficiency in a way that static rules cannot.

The invention's use of quantum key distribution extends to securing communications between multiple nodes within a network. By employing photon polarization across internal connections, the system ensures that data remains protected as it moves between servers, devices, or subsystems. This internal security measure is particularly valuable in distributed environments where data must traverse multiple points, reducing the risk of interception or manipulation within the network itself.

The continuous scanning and rule generation by the AI component are supported by a feedback loop that incorporates outcomes from the doppelganger simulations. As the system evaluates the results of its simulated responses, it refines the AI's criteria for identifying threats, creating a self-improving cycle. This iterative process ensures that the system becomes more adept at distinguishing between legitimate and harmful traffic over time, enhancing its long-term reliability.

The invention also addresses scalability by designing its components to handle increasing volumes of traffic and complexity. The quantum computing elements provide the necessary horsepower to process large datasets, while the AI's adaptability allows it to manage an expanding array of threats. This combination ensures that the system can grow with the network it protects, maintaining consistent performance as demands evolve.

The integration of these elements—generative AI, dynamic firewall rules, quantum computing, simulation, and advanced cryptography—creates a cohesive security framework. Each component complements the others, forming a system that operates as a unified whole rather than a collection of disparate tools. This holistic approach allows the invention to address a wide range of security concerns, from immediate threats to long-term network resilience.

In light of the preceding discussion, the following offers a streamlined summary of the present disclosure to provide a foundational understanding of its various components. This summary is not comprehensive, nor does it constrain the illustrative embodiments of the inventions outlined within this document. Its purpose is neither to highlight the most essential or pivotal features or steps of the disclosure, nor to establish its boundaries. Instead, it aims, as would be appreciated by someone well-versed in the field, to present certain concepts of the disclosure in a straightforward manner, serving as an introduction to the more in-depth explanation that follows. Throughout this application, the specification provides ample written descriptions of the inventions, encompassing exemplary, non-exhaustive, and non-restrictive methods and processes for creating and utilizing the inventions. These descriptions are articulated in complete, clear, concise, and precise language, enabling those skilled in the art to implement and apply the inventions without excessive trial and error, while also outlining the optimal approach envisioned for executing the inventions.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules. The doppelganger system mirrors the state of the network in real time, and the doppelganger system continuously synchronizes with the network to reflect current conditions.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules. The doppelganger system mirrors the state of the network in real time, and the doppelganger system continuously synchronizes with the network to reflect current conditions. The doppelganger system simulates multiple scenarios for each packet, and the doppelganger system evaluates a range of potential outcomes using the quantum simulator.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules. The doppelganger system mirrors the state of the network in real time, and the doppelganger system continuously synchronizes with the network to reflect current conditions. The doppelganger system simulates multiple scenarios for each packet, and the doppelganger system evaluates a range of potential outcomes using the quantum simulator. The quantum key distribution system stores the quantum key in a key store, and the quantum key distribution system retrieves the quantum key for subsequent validations.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules. The doppelganger system mirrors the state of the network in real time, and the doppelganger system continuously synchronizes with the network to reflect current conditions. The doppelganger system simulates multiple scenarios for each packet, and the doppelganger system evaluates a range of potential outcomes using the quantum simulator. The quantum key distribution system stores the quantum key in a key store, and the quantum key distribution system retrieves the quantum key for subsequent validations. The firewall reroutes the network traffic upon detecting the eavesdropping, and the firewall redirects the network traffic to an alternative path free of interference.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system generates a deny list containing the potential malicious URLs identified from the internet data, and the deny list is updated dynamically based on ongoing scanning. A firewall updates a rule set with rules derived from the deny list, and the firewall applies the rule set to block network traffic associated with the potential malicious URLs.

The firewall monitors the network traffic to detect a distributed denial-of-service (DDoS) attack, and the firewall analyzes the network traffic for anomalies exceeding a predefined threshold. The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets.

A doppelganger system simulates effects of the packets on a mirrored network using a quantum simulator, and the doppelganger system mirrors a state of the network and determines whether to allow or deny the packets based on simulation outcomes. The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key.

The quantum key distribution system validates the network traffic using the quantum key, and the quantum key distribution system compares the quantum key with a key from the packets to authenticate the network traffic. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference. The generative AI system preprocesses the internet data before identifying the potential malicious URLs, and the generative AI system transforms raw data into a format suitable for analysis. The generative AI system updates its predictive model with feedback from the deny list, and the generative AI system refines its detection patterns based on prior identifications. The generative AI system generates an allow list containing URLs deemed non-malicious, and the firewall updates the rule set to permit traffic from the allow list. The firewall prioritizes the quantum rules over conventional rules in the rule set, and the firewall applies the quantum rules generated by the quantum firewall before other rules. The doppelganger system mirrors the state of the network in real time, and the doppelganger system continuously synchronizes with the network to reflect current conditions. The doppelganger system simulates multiple scenarios for each packet, and the doppelganger system evaluates a range of potential outcomes using the quantum simulator. The quantum key distribution system stores the quantum key in a key store, and the quantum key distribution system retrieves the quantum key for subsequent validations. The firewall reroutes the network traffic upon detecting the eavesdropping, and the firewall redirects the network traffic to an alternative path free of interference. The firewall adjusts a frequency of the updating of the rule set based on a threat level, and the firewall increases the frequency during periods of heightened risk.

In some arrangements, a method for securing a network is provided where a generative artificial intelligence (AI) system scans internet data to identify potential malicious uniform resource locators (URLs), and the generative AI system continuously collects and analyzes the internet data to detect patterns indicative of threats. The generative AI system preprocesses the internet data before identifying the potential malicious URLs, and the generative AI system transforms raw data into a format suitable for analysis. The generative AI system generates a deny list containing the potential malicious URLs identified from the internet data and an allow list containing URLs deemed non-malicious, and the deny list and the allow list are updated dynamically based on ongoing scanning.

The generative AI system updates its predictive model with feedback from the deny list, and the generative AI system refines its detection patterns based on prior identifications. A firewall updates a rule set with rules derived from the deny list and the allow list, and the firewall applies the rule set to block network traffic associated with the potential malicious URLs and permit traffic from the allow list. The firewall monitors the network traffic to detect a distributed denial-of-service (DDoS) attack, and the firewall analyzes the network traffic for anomalies exceeding a predefined threshold.

The firewall traces sources of the DDoS attack upon detection, and the firewall identifies originating addresses of disruptive traffic. The firewall generates additional rules to block the sources of the DDoS attack, and the firewall updates the rule set with the additional rules. A quantum firewall inspects packets of the network traffic using a quantum processor, and the quantum firewall generates quantum rules based on quantum analysis of the packets. The firewall prioritizes the quantum rules over conventional rules in the rule set, and the firewall applies the quantum rules generated by the quantum firewall before other rules.

A doppelganger system simulates effects of the packets on a mirrored network using a quantum simulator, and the doppelganger system mirrors a state of the network and determines whether to allow or deny the packets based on simulation outcomes. The doppelganger system mirrors the state of the network in real time, and the doppelganger system continuously synchronizes with the network to reflect current conditions. The doppelganger system simulates multiple scenarios for each packet, and the doppelganger system evaluates a range of potential outcomes using the quantum simulator.

The firewall applies the quantum rules and simulation outcomes to the rule set, and the firewall integrates results from the quantum firewall and the doppelganger system to regulate the network traffic. A quantum key distribution system generates a quantum key using photon polarization, and the quantum key distribution system emits photons and measures their polarization to create the quantum key. The quantum key distribution system validates the network traffic using the quantum key, and the quantum key distribution system compares the quantum key with a key from the packets to authenticate the network traffic.

The quantum key distribution system stores the quantum key in a key store, and the quantum key distribution system retrieves the quantum key for subsequent validations. The quantum key distribution system detects eavesdropping on the network traffic by analyzing disturbances in the photon polarization, and the quantum key distribution system identifies interference in a transmission path. The firewall adjusts the rule set based on the eavesdropping detection, and the firewall blocks traffic from the transmission path upon identifying the interference.

The firewall reroutes the network traffic upon detecting the eavesdropping, and the firewall redirects the network traffic to an alternative path free of interference. The firewall adjusts a frequency of the updating of the rule set based on a threat level, and the firewall increases the frequency during periods of heightened risk. The firewall analyzes historical traffic data to predict future threats, and the firewall uses patterns from past network traffic to preemptively update the rule set. The doppelganger system synchronizes simulation results with the generative AI system, and the doppelganger system provides feedback to refine the predictive model of the generative AI system. The quantum key distribution system encrypts internal network communications using the quantum key, and the quantum key distribution system secures data between network nodes.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules. The doppelganger system is further configured to mirror the state of the network in real time, and the doppelganger system continuously synchronizes with the network to reflect current conditions.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules. The doppelganger system is further configured to mirror the state of the network in real time, and the doppelganger system continuously synchronizes with the network to reflect current conditions. The doppelganger system is further configured to simulate multiple scenarios for each packet, and the doppelganger system evaluates a range of potential outcomes using the quantum simulator.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules. The doppelganger system is further configured to mirror the state of the network in real time, and the doppelganger system continuously synchronizes with the network to reflect current conditions. The doppelganger system is further configured to simulate multiple scenarios for each packet, and the doppelganger system evaluates a range of potential outcomes using the quantum simulator. The quantum key distribution system is further configured to store the quantum key in a key store, and the quantum key distribution system retrieves the quantum key for subsequent validations.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules. The doppelganger system is further configured to mirror the state of the network in real time, and the doppelganger system continuously synchronizes with the network to reflect current conditions. The doppelganger system is further configured to simulate multiple scenarios for each packet, and the doppelganger system evaluates a range of potential outcomes using the quantum simulator. The quantum key distribution system is further configured to store the quantum key in a key store, and the quantum key distribution system retrieves the quantum key for subsequent validations. The firewall is further configured to reroute the network traffic upon the quantum key distribution system detecting the eavesdropping, and the firewall redirects the network traffic to an alternative path free of interference.

In some arrangements, a system for securing a network is provided where the system comprises a generative artificial intelligence (AI) system configured to scan internet data to identify potential malicious uniform resource locators (URLs), and the generative AI system continuously collects and analyzes the internet data to detect patterns indicative of threats. The generative AI system is further configured to generate a deny list containing the potential malicious URLs identified from the internet data, and the generative AI system updates the deny list dynamically based on ongoing scanning. The system comprises a firewall configured to update a rule set with rules derived from the deny list, and the firewall applies the rule set to block network traffic associated with the potential malicious URLs.

The firewall is further configured to monitor the network traffic to detect a distributed denial-of-service (DDoS) attack, and the firewall analyzes the network traffic for anomalies exceeding a predefined threshold. The firewall is further configured to trace sources of the DDoS attack upon detection, and the firewall identifies originating addresses of disruptive traffic. The firewall is further configured to generate additional rules to block the sources of the DDoS attack, and the firewall updates the rule set with the additional rules. The system comprises a quantum firewall, including a quantum processor, configured to inspect packets of the network traffic, and the quantum firewall generates quantum rules based on quantum analysis of the packets performed by the quantum processor.

The system comprises a doppelganger system, including a mirrored network and a quantum simulator, configured to simulate effects of the packets on the mirrored network, and the doppelganger system mirrors a state of the network and determines whether to allow or deny the packets based on simulation outcomes produced by the quantum simulator. The firewall is further configured to apply the quantum rules and the simulation outcomes to the rule set, and the firewall integrates results from the quantum firewall and the doppelganger system to regulate the network traffic. The system comprises a quantum key distribution system, including a photon generator and a polarization detector, configured to generate a quantum key using photon polarization, and the quantum key distribution system emits photons via the photon generator and measures their polarization via the polarization detector to create the quantum key.

The quantum key distribution system is further configured to validate the network traffic using the quantum key, and the quantum key distribution system compares the quantum key with a key from the packets to authenticate the network traffic. The quantum key distribution system is further configured to detect eavesdropping on the network traffic by analyzing disturbances in the photon polarization, and the quantum key distribution system identifies interference in a transmission path through the polarization detector. The firewall is further configured to adjust the rule set based on the eavesdropping detection, and the firewall blocks traffic from the transmission path upon the quantum key distribution system identifying the interference. The generative AI system is further configured to preprocess the internet data before identifying the potential malicious URLs, and the generative AI system transforms raw data into a format suitable for analysis. The generative AI system is further configured to update its predictive model with feedback from the deny list, and the generative AI system refines its detection patterns based on prior identifications. The generative AI system is further configured to generate an allow list containing URLs deemed non-malicious, and the firewall updates the rule set to permit traffic from the allow list. The firewall is further configured to prioritize the quantum rules over conventional rules in the rule set, and the firewall applies the quantum rules generated by the quantum firewall before other rules. The doppelganger system is further configured to mirror the state of the network in real time, and the doppelganger system continuously synchronizes with the network to reflect current conditions. The doppelganger system is further configured to simulate multiple scenarios for each packet, and the doppelganger system evaluates a range of potential outcomes using the quantum simulator. The quantum key distribution system is further configured to store the quantum key in a key store, and the quantum key distribution system retrieves the quantum key for subsequent validations. The firewall is further configured to reroute the network traffic upon the quantum key distribution system detecting the eavesdropping, and the firewall redirects the network traffic to an alternative path free of interference. The firewall is further configured to adjust a frequency of updating the rule set based on a threat level detected in the network traffic, and the firewall increases the frequency during periods of heightened risk identified by the generative AI system or the quantum firewall. The doppelganger system is further configured to provide simulation feedback to the generative AI system, and the doppelganger system transmits outcomes of the simulation to refine the predictive model of the generative AI system. The quantum key distribution system is further configured to encrypt internal communications within the network using the quantum key, and the quantum key distribution system applies the quantum key to secure data transmitted between nodes of the network. The firewall is further configured to log historical traffic data and analyze the historical traffic data to predict future threats, and the firewall uses patterns from the historical traffic data to preemptively adjust the rule set before threats materialize.

The following description and claims, in conjunction with the drawings-all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates a comprehensive network security framework integrating generative AI, dynamic firewalls, quantum processing, and a doppelganger simulation system. It depicts the interconnections of components such as the generative AI system, firewall, quantum key distribution system, and doppelganger system, showcasing their roles in scanning, rule generation, traffic regulation, and secure communication.

FIG. 2 is an exemplary flow diagram in accordance with one or more embodiments disclosed herein that illustrates the detailed operational sequence of a network security process integrating generative AI, dynamic firewall management, quantum processing, simulation, and quantum key distribution. It depicts the step-by-step flow from collecting internet data through analyzing threats, updating rules, simulating packet effects, validating traffic, and encrypting communications, culminating in a continuous cycle.

FIG. 3 is an exemplary sequence diagram in accordance with one or more embodiments disclosed herein that illustrates the dynamic interactions among actors such as Network Traffic Source, Generative AI System, Firewall, Quantum Firewall, Doppelganger System, Quantum Key Distribution System, and Network Administrator in securing a network. It depicts the flow of actions from receiving network traffic packets through analyzing threats, updating rules, simulating packet effects, validating traffic with quantum keys, and reporting security status, showcasing a comprehensive, real-time security process.

FIG. 4 is an exemplary class diagram in accordance with one or more embodiments disclosed herein that illustrates the object-oriented structure of a network security framework integrating generative AI, dynamic firewall management, quantum processing, simulation, and quantum key distribution. It depicts the relationships and interactions among classes such as Network Manager, Generative AI System, Firewall, Quantum Firewall, Doppelganger System, Quantum Key Distribution System, and Traffic Processor, detailing their attributes and methods for implementing the system's comprehensive security functionalities.

DETAILED DESCRIPTION

The invention represents a sophisticated network security framework designed to protect digital infrastructure through an innovative blend of generative artificial intelligence, dynamic firewall management, quantum computing, simulation technology, and quantum cryptography. This multi-faceted system addresses the evolving landscape of cyber threats by integrating cutting-edge technologies into a cohesive architecture that operates in real time to detect, analyze, and mitigate risks. At its foundation, the system leverages a generative AI component that continuously scans the internet, identifying potential malicious URLs by analyzing patterns and characteristics in vast datasets. This AI-driven approach allows the system to adapt to new threats as they emerge, generating dynamic lists of URLs to either block or permit, which are then seamlessly integrated into the network's defensive mechanisms.

A key element of this framework is its dynamic firewall, which serves as the primary enforcer of security policies. Unlike traditional static firewalls, this component updates its rule set on the fly, incorporating inputs from the generative AI system to block traffic from identified malicious sources and allow legitimate traffic to proceed. The firewall's ability to adapt in real time ensures that the network remains protected against rapidly evolving threats, such as newly registered malicious domains or repurposed legitimate ones. This adaptability is further enhanced by the firewall's capacity to monitor network traffic for anomalies, such as distributed denial-of-service (DDoS) attacks, and to trace the sources of such disruptions, generating additional rules to neutralize them promptly.

The integration of quantum computing introduces a layer of advanced analysis that sets this invention apart from conventional security solutions. The quantum firewall, equipped with a quantum processor, inspects network packets at a level of detail unattainable by classical systems, generating quantum rules based on this analysis. These rules, which take precedence over conventional ones, enable the system to detect and respond to subtle threats embedded within encrypted traffic or other complex data streams. This quantum capability ensures that the system can address sophisticated attacks that might otherwise evade detection, providing a robust defense against next-generation cyber threats.

Another standout feature is the doppelganger system, a unique simulation environment that mirrors the network's state in real time. This system receives packets from the firewall and uses a quantum simulator to model their potential effects before they are processed by the live network. By evaluating multiple scenarios—such as packet acceptance, denial, or rerouting—the doppelganger system determines the safest course of action, sending these outcomes back to the firewall to update its rule set. This preemptive testing mechanism prevents harmful packets from impacting the network, offering a proactive rather than reactive approach to security that is particularly effective against zero-day attacks or unpredictable attack vectors.

The invention also incorporates a quantum key distribution system, which enhances secure communication through the use of photon polarization. This system generates quantum keys by emitting photons and measuring their polarization states, storing them in a secure key store for use in validating network traffic. By comparing these keys with those embedded in packets, the system authenticates legitimate traffic, ensuring that only authorized data flows through the network. This cryptographic approach leverages quantum properties to provide a level of security that is resistant to interception, as any attempt to measure the photons would disturb their state, alerting the system to potential eavesdropping.

Eavesdropping detection is a critical aspect of this quantum key distribution system, where disturbances in photon polarization are analyzed to identify interference along transmission paths. Upon detecting such interference, the system notifies the firewall, which then blocks traffic from the compromised path and reroutes it to an alternative route. This capability ensures the integrity of communications, protecting against man-in-the-middle attacks or other forms of unauthorized monitoring that could compromise sensitive data. The seamless integration of this detection with the firewall's traffic management underscores the system's holistic approach to security.

The firewall's adaptability extends beyond immediate threat response to include dynamic adjustments based on threat levels. It can increase the frequency of rule set updates during periods of heightened risk, such as during a detected DDoS attack or following the identification of a new malicious URL trend. This flexibility ensures that the system remains responsive to the network's current state, balancing performance and protection without requiring manual intervention. Such automation is a core strength, reducing the burden on network administrators while maintaining robust defenses.

Historical traffic analysis further enhances the system's proactive capabilities, allowing it to predict future threats based on past patterns. The firewall logs traffic data over time, analyzing it to identify trends or anomalies that might indicate emerging risks, such as a gradual increase in traffic from a specific region known for cyber activity. These predictions are used to preemptively update the rule set, closing potential vulnerabilities before they can be targeted. This forward-looking approach complements the real-time monitoring and simulation components, creating a multi-layered defense strategy.

The doppelganger system's simulation results are not only applied to the firewall but also synchronized with the generative AI system, refining its predictive model. This feedback loop ensures that the AI learns from the virtual testing outcomes, improving its ability to identify threats over time. For example, if a simulated packet reveals a new attack pattern, this insight is fed back to the AI, which adjusts its detection criteria accordingly. This iterative improvement process is a unique feature that enhances the system's long-term effectiveness.

Internal network communications benefit from the quantum key distribution system's encryption capabilities, where quantum keys are used to secure data transmitted between network nodes. This ensures that even within the network, data remains protected from interception or tampering, a critical consideration in distributed environments where sensitive information traverses multiple points. The use of quantum keys for internal encryption leverages the same secure infrastructure used for external traffic validation, maximizing efficiency and consistency across the system.

The traffic processor class acts as the final stage in the packet handling pipeline, queuing and processing validated traffic before forwarding it to its destination. This component ensures that only packets that have passed through the rigorous checks of the quantum firewall, doppelganger system, and key validation are released, maintaining the integrity of the network's output. Its role, while seemingly straightforward, is essential to the system's end-to-end security model, ensuring that no unverified traffic slips through due to processing bottlenecks or oversight.

The Network Manager class oversees the entire operation, initializing the system and coordinating interactions among all components. It maintains a high-level view of traffic status, threat levels, and historical data, using this information to direct the activities of the generative AI, firewall, quantum systems, and traffic processor. Its ability to predict threats and adjust operational parameters—such as rule update frequency—ties together the system's proactive and reactive elements, ensuring a balanced and effective defense strategy.

The interconnections among these classes form a tightly knit architecture where data flows seamlessly from one component to the next. The Generative AI System provides threat intelligence to the Firewall, which collaborates with the Quantum Firewall and Doppelganger System for advanced analysis and simulation, while the Quantum Key Distribution System secures communications and validates traffic. The Traffic Processor finalizes the flow, and the Network Manager orchestrates it all, creating a system where each part enhances the others' capabilities, resulting in a robust and resilient security framework.

This invention's use of quantum technology—both in packet inspection and key distribution—represents a significant leap forward in network security, offering protections that are theoretically unbreakable by classical computing methods. The combination of real-time AI analysis, dynamic rule updates, virtual simulation, and quantum cryptography addresses a wide range of threats, from immediate attacks like DDoS to long-term risks like data interception, making it a versatile solution for modern networks. Its modular design allows for scalability and customization, enabling deployment in diverse environments, from small enterprises to large-scale data centers.

The explanation of the various example embodiments presented here is designed to fulfill the objectives previously mentioned, drawing on the illustrations provided within this disclosure. These illustrations showcase a variety of systems and methods for putting the disclosed concepts into practice. It is understood that different approaches to implementation are feasible, and adjustments to both the structure and operation of these systems and methods are permissible. The description elaborates on numerous connections among components, which should be understood in a flexible sense. Unless specifically noted otherwise, such connections may be direct or indirect and can be facilitated through either wired or wireless means. This document is not intended to limit the form or type of these connections.

The invention, a sophisticated network security framework integrating generative artificial intelligence, dynamic firewall management, quantum processing, simulation, and quantum key distribution, leverages several types of artificial intelligence (AI) to implement its various aspects. Below, various sample applicable AI types can be utilized such as Generative AI, Supervised Learning, Unsupervised Learning, Reinforcement Learning, and Deep Learning.

Generative AI is a type of artificial intelligence that focuses on creating new content or data based on patterns learned from existing datasets, often producing outputs that mimic the characteristics of the training data without replicating it exactly. In this invention, Generative AI is directly applicable to the core component responsible for scanning internet data to identify potential malicious URLs and generating dynamic deny and allow lists, as seen in the Generative AI System (402) class and the generate deny list of potential malicious URLs (212) flow step. It excels at synthesizing potential threat patterns by learning from vast internet traffic datasets, enabling the system to anticipate and flag emerging malicious URLs that may not yet exist in known threat databases. This capability allows the system to proactively update the firewall's rule set with newly generated rules, enhancing its adaptability to evolving cyber threats. Examples of Generative AI that could be used include Generative Adversarial Networks (GANs), where a generator creates potential malicious URL patterns and a discriminator evaluates their likelihood, or Variational Autoencoders (VAEs), which could model URL distributions and generate synthetic threats for training, implemented using frameworks like TensorFlow or PyTorch on cloud platforms like AWS.

Supervised Learning involves training an AI model on a labeled dataset, where each input is paired with a correct output, allowing the model to learn a mapping function that predicts outcomes for new, unseen data. This type of AI is applicable to the invention's threat detection and classification processes, particularly in the analyze preprocessed data with generative AI to detect threat patterns (206) and identify potential malicious URLs based on detected patterns (208) steps, as well as the predictive model attribute in the Generative AI System (402). Supervised Learning can be used to train the system to classify URLs as malicious or benign based on labeled historical data, such as URLs tagged with their threat status from past incidents, improving the accuracy of the deny and allow lists. It also supports the firewall's ability to detect DDoS attacks by learning from labeled traffic samples indicating normal versus attack conditions, as in the detect distributed denial-of-service (DDoS) attack if anomalies exceed threshold (222) step. Examples include Support Vector Machines (SVMs) for binary URL classification, trained using scikit-learn on a dataset of known malicious and safe URLs, or Random Forests for DDoS detection, leveraging their ability to handle high-dimensional traffic data, deployed on a dedicated server for real-time inference.

Unsupervised Learning entails training an AI model on unlabeled data, allowing it to identify inherent patterns, clusters, or anomalies without predefined outputs, making it ideal for discovering hidden structures within complex datasets. In this invention, Unsupervised Learning is highly applicable to the initial stages of threat detection, such as the monitor network traffic for anomalies (220) step and the traffic monitoring module attribute in the Firewall (404) class, where it can detect unusual traffic patterns—like sudden spikes or irregular connection attempts—without requiring prior labeling. It could also enhance the generative AI's ability to preprocess internet data into structured format (204) by clustering similar URL features (e.g., domain length, character entropy) to uncover latent threat indicators, supporting the system's proactive stance against unknown threats. Examples include K-Means Clustering, implemented in Python with scikit-learn to group traffic anomalies for further analysis, or Autoencoders, which could compress and reconstruct internet data to highlight outliers, trained using Keras and deployed on a GPU cluster for scalability.

Reinforcement Learning is a type of AI where an agent learns to make decisions by interacting with an environment, receiving rewards or consequences based on its actions, and optimizing a cumulative reward over time without explicit supervision. This approach is particularly applicable to the invention's dynamic rule adjustment and simulation optimization aspects, such as the adjust frequency of rule set updates based on threat level (268) step and the doppelganger system's evaluate multiple scenarios for each packet simulation (244) process. Reinforcement Learning can train the system to adaptively adjust the firewall's update frequency by rewarding timely responses to heightened threats (e.g., faster updates during a DDoS attack) and penalizing delays, enhancing responsiveness. It could also optimize the doppelganger system's simulation outcomes by rewarding decisions that correctly predict safe versus harmful packets, refining the system's preemptive capabilities. Examples include Q-Learning, implemented in Python with OpenAI Gym to tune rule update policies based on simulated threat scenarios, or Deep Q-Networks (DQNs), which could optimize simulation decisions using neural networks in TensorFlow, running on a reinforcement learning server to handle complex network states.

Deep Learning, a subset of machine learning, utilizes multi-layered neural networks to model complex patterns in large datasets, excelling at tasks requiring high-level abstraction, such as image recognition or natural language processing. In this invention, Deep Learning is broadly applicable to the generative AI's threat detection and the doppelganger system's simulation processes, specifically in the analyze data and identify potential malicious URLs (306) sequence step and the simulate packets method in the Doppelganger System (408) class. It can enhance the AI's ability to detect intricate threat patterns in internet data by modeling sequential dependencies in URL structures or traffic flows, improving the precision of the deny and allow lists. For the doppelganger system, Deep Learning can simulate packet effects by learning from vast datasets of network states and packet interactions, enabling accurate multi-scenario evaluations that mirror real-world conditions. Examples include Convolutional Neural Networks (CNNs) for URL pattern recognition, trained with PyTorch on a dataset of URL sequences to detect malicious signatures, or Recurrent Neural Networks (RNNs) like LSTMs for traffic simulation, implemented in Keras to model temporal packet behaviors, deployed on a high-performance computing cluster for real-time processing.

Each of these AI types contributes uniquely to the invention's functionality, forming a synergistic ecosystem that addresses diverse security needs. Generative AI drives proactive threat generation, creating synthetic data to anticipate new risks, while Supervised Learning refines classification accuracy using known examples, ensuring reliable threat identification. Unsupervised Learning uncovers hidden anomalies, bolstering the system's ability to detect novel threats without prior knowledge, and Reinforcement Learning optimizes dynamic responses, adapting the system to changing conditions. Deep Learning ties these together by providing the computational depth needed for complex pattern recognition and simulation, enabling the system to handle the vast, intricate datasets inherent in network security. Together, they support the invention's key aspects—real-time threat detection, dynamic rule updates, quantum-enhanced analysis, simulation-based decision-making, and secure communication—making it a robust, adaptable solution for modern cybersecurity challenges. Examples like GANs, SVMs, K-Means, Q-Learning, and CNNs illustrate practical implementations, leveraging widely available tools and platforms to bring the invention's concepts to life in a scalable, efficient manner.

FIG. 1 represents a highly detailed and integrated network security framework that combines advanced computational techniques with quantum technologies, encapsulating all core, key, and unique functionalities, modules, components, and applicable limitations as described in the system and method specifications, along with the provided pseudocode. Central to this diagram is the generative artificial intelligence (AI) system (100), a foundational module tasked with scanning vast streams of internet data to pinpoint potential malicious uniform resource locators (URLs). This system operates continuously, collecting raw internet data from diverse sources such as web traffic logs, domain registries, and real-time feeds, then analyzing it to detect intricate patterns that signal threats. For example, this could be implemented using a deep learning framework like PyTorch, running on a distributed cluster of GPUs, trained on datasets of known malicious URLs augmented with synthetic data generated by adversarial networks to enhance its predictive capabilities.

Connected directly to the generative AI system (100) is the internet data input (102), which serves as the entry point for raw internet traffic data into the system. This component funnels unprocessed data—such as HTTP requests, DNS queries, and packet headers—gathered from tools like packet sniffers or APIs interfacing with global internet monitoring services. An example implementation might involve a RESTful API endpoint pulling data from Cloudflare's 1.1.1.1 resolver logs or a custom web crawler scraping domain registrations. This raw data flows into the preprocessing module (104), which transforms it into a structured, machine-readable format by normalizing URL strings, extracting features like domain time or IP reputation, and removing noise such as redundant packets. A practical realization could be a Python-based data pipeline leveraging libraries like Scikit-learn for feature extraction and Apache Kafka for streaming data handling, ensuring scalability across high-volume inputs.

The preprocessed data then passes to the URL detection module (106), which identifies potential malicious URLs by applying the analytical power of the predictive model (108). This module processes features like URL length, character entropy, or embedded scripts to flag suspicious entries, relying on the predictive model (108) to classify them based on learned threat patterns. For instance, this could be a convolutional neural network analyzing URL sequences, deployed on an AWS EC2 instance with real-time inference capabilities. The predictive model (108), linked to the URL detection module (106), drives this classification process and continuously refines its accuracy by incorporating feedback from its outputs. An example might involve a recurrent neural network with a feedback loop, using TensorFlow's Keras API, where weights are adjusted based on detection outcomes stored in a MongoDB database, aligning with the pseudocode's updateModelWithFeedback function.

From the predictive model (108), the data diverges to the deny list generator (110) and allow list generator (112), which compile dynamic lists of URLs to block or permit based on the model's classifications. The deny list generator (110) aggregates URLs deemed malicious—such as those hosting phishing pages or command-and-control servers—while the allow list generator (112) catalogs safe URLs, like trusted corporate domains. These could be implemented as Redis sets for rapid updates and retrieval, with the deny list syncing hourly and the allow list refreshed daily based on traffic patterns. The feedback processor (114) connects back from both generators to the predictive model (108), aggregating classification results to fine-tune the model's threat detection logic. This might be a Node.js service processing JSON logs of false positives and negatives, feeding them into the model's training pipeline.

The firewall (116) forms a critical component, interfacing with the rule set database (118) to apply rules derived from the deny list generator (110) and allow list generator (112). This firewall manages incoming and outgoing network traffic, enforcing policies to block malicious URLs and permit safe ones, and could be a hardware solution like a Palo Alto Networks PA-Series device with custom rule integration. The rule set database (118) stores these policies, dynamically updated with rules specifying IP addresses, ports, and protocols, and serves as a nexus connecting multiple system components. An example might be a PostgreSQL database with indexed tables for rapid rule lookups, supporting millions of entries with triggers for real-time updates from various sources.

The traffic monitoring module (120), linked from the firewall (116) and network traffic input (162), continuously observes network traffic for anomalies, capturing metrics like packet rates and connection attempts. This aligns with the pseudocode's monitorTrafficForDDoS function and could be implemented using a tool like Zeek, integrated into the firewall's traffic analysis layer. The DDoS detection module (122), connected from the traffic monitoring module (120), identifies distributed denial-of-service attacks by comparing traffic metrics against a predefined threshold—say, 10,000 packets per second from a single source—triggering alerts when exceeded. This might use a statistical model in R, running on a dedicated server, analyzing live traffic streams.

The source tracing module (124) connects from the DDoS detection module (122) to the rule generator (126), tracing attack origins by resolving IP addresses and correlating them with traffic patterns, as seen in the traceDDoSSources pseudocode step. An example could be a Perl script using Net::Traceroute to map attack paths, integrated with a GeoIP database for location data. The rule generator (126) then creates additional rules to block these sources, feeding them into the rule set database (118), potentially as iptables commands specifying deny actions for specific IPs and ports.

The traffic regulation module (128), linked from the firewall (116), enforces the rule set to regulate traffic flow, ensuring only authorized packets pass through. This could be a software-defined networking (SDN) controller like OpenDaylight, dynamically adjusting traffic based on rule priorities. The quantum firewall (130), incorporating the quantum processor (132), inspects packets using quantum-based analysis, generating quantum rules via the quantum rule generator (134), which connects to the rule set database (118). This aligns with the processPacketsWithQuantumFirewall pseudocode and might involve a quantum computing platform like Google's Sycamore processor, analyzing packet quantum states for anomalies, with rules encoded as quantum circuits.

The doppelganger system (136) comprises the mirrored network (138), which replicates the network's state, and the quantum simulator (140), which simulates packet effects, per the simulatePacketProcessing pseudocode. The mirrored network (138) could be a Kubernetes cluster running a virtualized network replica, while the quantum simulator (140) might use Q on Microsoft Azure Quantum to model packet interactions. The real-time synchronization module (142) ensures the mirrored network (138) reflects current conditions, possibly via a WebSocket-based sync tool updating every millisecond. The multi-scenario simulation module (144) connects to the quantum simulator (140), evaluating multiple packet outcomes—like denial, rerouting, or acceptance—using parallel quantum simulations, potentially implemented with a custom C++ engine.

The simulation outcome processor (146) processes these results, feeding decisions into the rule set database (118), and could be a Python script parsing simulation logs into actionable rules. The quantum key distribution system (148) includes the photon generator (150) and polarization detector (152), which together drive the quantum key generator (154) to produce quantum keys using photon polarization, per the generateQuantumKey pseudocode. This might use a setup like Toshiba's quantum key distribution hardware, emitting photons at 1550 nm and measuring polarization states with avalanche photodiodes, with keys stored in the key store (156), a hardened memory enclave like Intel SGX.

The traffic validation module (158), linked from the key store (156) and packet queue (164), authenticates traffic using these quantum keys, comparing them to packet-embedded keys, and could be a C-based protocol handler in the firewall. The eavesdropping detection module (160), connected from the polarization detector (152), identifies interference by analyzing photon polarization disturbances, feeding alerts to the rule set database (118), per the detectEavesdropping pseudocode. This might be a quantum state tomography routine running on a dedicated Raspberry Pi with photon sensors.

The network traffic input (162) feeds raw traffic into the traffic monitoring module (120) and packet queue (164), distributing it for processing, and could be a 10 Gbps network tap like a NetScout device. The packet queue (164) manages packet flow to the quantum processor (132), mirrored network (138), and traffic validation module (158), aligning with the runSecuritySystem pseudocode, and might use RabbitMQ for queue management across distributed nodes.

The rerouting module (166) and frequency adjustment module (168), both connected from the traffic regulation module (128), redirect traffic to safe paths and adjust rule update frequency based on threat levels, respectively. The rerouting module (166) could be a BGP routing script, while the frequency adjustment module (168) might be a cron job scheduler escalating updates from hourly to every minute during attacks. The historical traffic logger (170), linked from the traffic monitoring module (120), records traffic data, feeding the threat prediction module (172), which anticipates threats and updates the rule set database (118). These could be an Elasticsearch stack for logging and a time-series forecasting model in Julia.

The internal communication encryptor (174), connected from the quantum key generator (154) to the traffic regulation module (128), secures internal network data with quantum keys, potentiallyvia an OpenVPN instance using quantum-derived keys. The feedback synchronizer (176), linked from the simulation outcome processor (146) to the predictive model (108), refines the AI model with simulation insights, and could be an Apache Airflow workflow syncing JSON—formatted results hourly.

This FIG. 1 diagram integrates generative AI, dynamic firewalls, quantum processing, simulation, and secure key distribution into a cohesive, adaptive security system, with all components interconnected to ensure comprehensive network protection, as detailed in the system specifications, method steps, and pseudocode, with practical examples grounding each element in real-world implementation possibilities.

FIG. 2 represents an exemplary operational sequence for a sophisticated network security process that integrates generative artificial intelligence, dynamic firewall management, quantum processing, simulation, and quantum key distribution, encapsulating all flow steps, key features, core elements, and process limitations as detailed in the method specifications, along with applicable functionalities from the system specifications. This detailed flow begins with the step to start network security process (200), initiating a continuous cycle of protection mechanisms designed to safeguard a network from a wide array of threats. This initial action sets in motion a series of interconnected processes that operate both sequentially and in parallel, ensuring comprehensive monitoring and response capabilities across the network infrastructure. It could be visualized as the activation of a centralized control script, perhaps written in Python, that triggers all subsequent modules and threads within a distributed system, establishing the foundation for real-time threat detection and mitigation.

Following this initiation, the process moves to collect internet data continuously (202), where vast streams of raw internet data—such as HTTP requests, DNS queries, and packet headers—are gathered from diverse sources like web crawlers, public APIs, or network taps. This step aligns with the generative AI system's role in scanning internet data to identify potential malicious URLs, continuously pulling in data to maintain an up-to-date view of the digital landscape. An implementation might involve a high-throughput data ingestion pipeline using Apache Kafka, running on a cluster of servers, capable of processing terabytes of data daily from global internet feeds, ensuring no potential threat goes unnoticed.

Next, the flow proceeds to preprocess internet data into structured format (204), transforming the raw, unstructured data into a machine-readable form by normalizing URLs, extracting features like domain time or IP reputation, and filtering out noise such as duplicate entries or irrelevant packets. This preprocessing is essential for effective AI analysis, reflecting the system's preprocessing module functionality, and could be realized through a data pipeline employing libraries like Pandas and NumPy, running on a dedicated preprocessing server to handle millions of records per hour, ensuring data quality and consistency for downstream analysis.

The preprocessed data then advances to analyze preprocessed data with generative AI to detect threat patterns (206), where the generative AI system scrutinizes the structured data to uncover patterns indicative of threats, such as unusual character sequences in URLs or spikes in traffic from specific domains. This step leverages the AI's predictive capabilities, a core element of the invention, and might be implemented using a deep learning model like a transformer network on a GPU cluster, trained on historical threat data to recognize subtle malicious signatures with high accuracy.

From this analysis, the flow continues to identify potential malicious URLs based on detected patterns (208), pinpointing specific URLs that exhibit threatening characteristics, such as those linked to phishing sites or malware distribution networks. This identification is a critical output of the generative AI system, directly tied to its scanning process, and could involve a classification algorithm outputting a confidence score for each URL, with thresholds set to flag high-risk entries, executed within a real-time inference engine like TensorFlow Serving.

The process then updates the predictive model with feedback from URL identification (210), refining the AI's detection logic by incorporating outcomes—such as false positives or confirmed threats—back into its training cycle. This feedback loop enhances the model's precision over time, a unique feature mirrored in the system's feedback processor, and might be implemented as an online learning system where a subset of the model's weights is updated hourly using a custom script interfacing with a feedback database like MongoDB.

Subsequently, the flow generates a deny list of potential malicious URLs (212), compiling a dynamic list of URLs to block based on the AI's identifications, such as those hosting command-and-control servers or ransomware payloads. This step, integral to the firewall's rule generation, could use a Redis database to store and update the list in real-time, ensuring rapid dissemination to downstream security components, reflecting the generative AI's deny list generator functionality.

In parallel, the process generates an allow list of non-malicious URLs (214), creating a complementary list of safe URLs, like trusted corporate domains or verified service endpoints, to ensure legitimate traffic flows unimpeded. This dual-list approach enhances network efficiency, a core feature, and might be implemented as a secondary Redis set, updated daily based on whitelisting criteria derived from traffic patterns and domain reputation APIs, aligning with the allow list generator module.

The flow then updates the firewall rule set with deny list rules (216), integrating the deny list into the firewall's rule set to block traffic from identified malicious URLs, specifying IP addresses, ports, and protocols to be denied. This step reflects the firewall's traffic regulation role and could involve a script pushing rules to a hardware firewall like a Cisco ASA, ensuring immediate enforcement across the network perimeter.

Simultaneously, the process updates the firewall rule set with allow list rules (218), adding rules to permit traffic from the allow list, ensuring uninterrupted access to safe resources. This dual-rule update, a key limitation, might be executed via an API call to the firewall's management interface, maintaining a balance between security and accessibility, consistent with the firewall's rule set database functionality.

The flow advances to monitor network traffic for anomalies (220), where the system continuously observes incoming and outgoing traffic for irregularities, such as sudden packet rate increases or unusual connection patterns. This monitoring, a foundational process, could be implemented using a network analysis tool like Zeek, integrated into the firewall, capturing live traffic metrics for real-time scrutiny, reflecting the traffic monitoring module's role.

If anomalies are detected, the process moves to detect distributed denial-of-service (DDoS) attack if anomalies exceed threshold (222), identifying a DDoS attack when traffic metrics surpass a predefined limit—for example, 15,000 packets per second from a single source. This detection, a critical feature, might use a statistical anomaly detection algorithm in Python, running on a dedicated server, comparing live data against historical baselines, aligning with the DDoS detection module.

Upon detection, the flow traces sources of DDoS attack to identify originating addresses (224), mapping the attack's origins by resolving IP addresses and correlating them with traffic patterns. This tracing, essential for targeted mitigation, could employ a traceroute utility combined with a GeoIP lookup service, executed within a Perl script, reflecting the source tracing module's functionality.

The process then generates additional rules to block DDoS sources (226), creating specific firewall rules to deny traffic from identified attack origins, such as blocking entire IP ranges. This rule generation, a key step, might be a Bash script generating iptables commands, pushed to the firewall, consistent with the rule generator component.

Next, the flow updates the firewall rule set with DDoS blocking rules (228), integrating these new rules into the existing set to halt the attack's impact. This update, a process limitation, could involve an automated API call to the firewall's rule management system, ensuring rapid response, mirroring the firewall's rule set updates.

Concurrently, the process receives incoming network traffic packets (230), accepting packets from the network for further processing, a foundational input step. This could be a network tap like a NetScout device feeding packets into a processing queue, aligning with the network traffic input component.

The flow then queues packets for processing (232), organizing incoming packets into a prioritized queue for distribution to various analysis modules. This queuing, a core element, might use RabbitMQ on a distributed cluster, ensuring efficient packet handling, reflecting the packet queue functionality.

The queued packets proceed to inspect packets using quantum processor (234), where a quantum processor analyzes packet contents for subtle threats undetectable by classical means, generating quantum rules. This quantum inspection, a unique feature, could leverage a platform like IBM Qiskit, running quantum algorithms on packet headers, consistent with the quantum firewall and processor.

The process generates quantum rules based on quantum inspection (236), producing rules to allow or deny packets based on quantum analysis outcomes, such as quantum state anomalies. This step, a key limitation, might output rules as quantum circuit instructions, integrated into the firewall, mirroring the quantum rule generator.

The flow then prioritizes quantum rules over conventional rules in rule set (238), ensuring quantum-derived rules take precedence in the firewall's decision-making process. This prioritization, a unique process, could be a configuration setting in the firewall's rule engine, reflecting the firewall's traffic regulation module.

In parallel, the process mirrors network state in real-time for simulation (240), replicating the network's current state in a virtual environment for testing. This mirroring, a core feature, might use a virtualization platform like VMware with real-time data sync via WebSockets, aligning with the doppelganger system's mirrored network.

The flow simulates packet effects on mirrored network with quantum simulator (242), modeling how packets would impact the network using a quantum simulator. This simulation, a standout element, could employ Q on Azure Quantum, testing packet behavior, consistent with the quantum simulator component.

The process evaluates multiple scenarios for each packet simulation (244), assessing various outcomes—like denial or rerouting—for each packet to inform decisions. This multi-scenario evaluation, a unique limitation, might be a C++ simulation engine running parallel threads, reflecting the multi-scenario simulation module.

The flow determines allow or deny decision based on simulation outcomes (246), finalizing whether to permit or block each packet based on simulation results. This decision-making, a critical step, could be a Python script parsing simulation logs, aligning with the simulation outcome processor.

The process then applies quantum rules and simulation outcomes to firewall rule set (248), updating the firewall with both quantum and simulation-derived rules to regulate traffic. This application, a key feature, might involve an API pushing rules to a software-defined firewall, consistent with the firewall's integration capabilities.

Simultaneously, the flow emits photons to generate quantum key (250), initiating quantum key generation by emitting photons for polarization measurement. This step, a unique process, could use a photon source like ID Quantique's Cerberis, reflecting the photon generator in the quantum key distribution system.

The process measures photon polarization to create quantum key (252), measuring the photons' polarization states to form a secure quantum key. This measurement, a core element, might employ avalanche photodiodes in a custom setup, aligning with the polarization detector.

The flow stores quantum key in key store (254), securely saving the key for validation use, a critical limitation. This could be a hardened memory vault using Intel SGX, consistent with the key store component.

The process compares quantum key with packet key to validate traffic (256), authenticating packets by matching their embedded keys against the stored quantum key. This validation, a key feature, might be a C protocol handler in the firewall, reflecting the traffic validation module.

The flow forwards validated traffic through firewall (258), allowing authenticated packets to proceed, ensuring secure traffic flow. This forwarding, a basic step, could be a firewall routing rule, aligning with the traffic regulation module.

In parallel, the process analyzes photon polarization for disturbances to detect eavesdropping (260), checking for interference in photon states that indicate unauthorized monitoring. This detection, a unique feature, might use quantum state tomography on a dedicated device, consistent with the eavesdropping detection module.

The flow identifies interference in transmission path if disturbances detected (262), pinpointing compromised paths when eavesdropping is confirmed. This identification, a critical limitation, could be a script correlating disturbances with network segments, reflecting the quantum key distribution system's capabilities.

The process blocks traffic from interfered path by updating rule set (264), denying traffic from compromised paths via new firewall rules. This blocking, a key step, might push rules via an API to the firewall, aligning with the firewall's adjustment process.

The flow reroutes network traffic to alternative path if eavesdropping detected (266), redirecting traffic to secure paths to maintain connectivity. This rerouting, a unique limitation, could use BGP routing adjustments, consistent with the rerouting module.

The process adjusts frequency of rule set updates based on threat level (268), increasing update frequency during high-risk periods, such as after a DDoS detection. This adjustment, a core feature, might be a scheduler in Bash escalating from hourly to every minute, reflecting the frequency adjustment module.

The flow analyzes historical traffic data to predict future threats (270), using past traffic patterns to anticipate risks, enhancing proactive defense. This analysis, a standout element, could be a time-series model in R, aligning with the threat prediction module.

The process updates rule set preemptively based on threat predictions (272), adjusting rules before threats materialize, a unique process. This might involve an automated rule generator script, consistent with the firewall's predictive capabilities.

The flow synchronizes simulation results with generative AI predictive model (274), feeding simulation outcomes back to refine the AI's predictions. This synchronization, a key limitation, could be an Apache Airflow workflow syncing JSON results, reflecting the feedback synchronizer.

The process encrypts internal network communications using quantum key (276), securing node-to-node data with quantum keys, ensuring internal integrity. This encryption, a core feature, might use OpenVPN with quantum-derived keys, aligning with the internal communication encryptor.

Finally, the flow ends network security process cycle and repeat (278), concluding one iteration and looping back to the start, maintaining continuous protection. This cyclical nature, a foundational element, could be a controlling script restarting every cycle, ensuring relentless operation across all components.

This FIG. 2 flow diagram encapsulates the invention's operational sequence, integrating all method steps and system functionalities into a detailed, interconnected process that leverages AI, quantum technology, and simulation for robust network security, with each step expanded to illustrate its role and implementation potential within the broader system architecture.

FIG. 3 represents an intricate and detailed depiction of the interactions within a network security framework that leverages generative artificial intelligence, dynamic firewall management, quantum processing, simulation, and quantum key distribution, encapsulating key functionalities and processes as specified in the invention's design. This diagram illustrates the flow of actions and data exchanges between: Network Traffic Source, Generative AI System, Firewall, Quantum Firewall, Doppelganger System, Quantum Key Distribution System, and Network Administrator, each playing a critical role in securing the network through a series of meticulously choreographed steps. The sequence begins with Network Traffic Source sends incoming network traffic packets to Firewall (300), where the Network Traffic Source-representing external entities like user devices, servers, or internet gateways-initiates the process by transmitting a continuous stream of network packets, such as TCP/IP packets containing HTTP requests or DNS queries, into the system. These packets, which might originate from a corporate LAN or a public internet feed, are received by the Firewall, acting as the primary gatekeeper that filters and manages all incoming and outgoing traffic.

Following this, the sequence progresses to Firewall requests internet data collection from Generative AI System (302), where the Firewall, recognizing the need for comprehensive threat intelligence, sends a request to the Generative AI System to gather real-time internet data. This request could be an API call, perhaps formatted in JSON, asking for the latest data on URLs and traffic patterns from across the web. The Generative AI System then responds with collects and preprocesses internet data (304), where it actively pulls in raw data—such as domain registration logs, web traffic statistics, or packet captures—from sources like global DNS resolvers or web crawlers, then preprocesses it by normalizing URLs, extracting features like IP reputation or request frequency, and structuring it into a format suitable for analysis, potentially using a preprocessing pipeline built with Python and Apache Spark.

Next, the flow advances to Generative AI System analyzes data and identifies potential malicious URLs (306), where the system employs its AI capabilities to scrutinize the preprocessed data, detecting patterns indicative of threats—like phishing URLs or malware hosts—using a deep learning model that might be a transformer network running on a GPU cluster. The Generative AI System then generates deny list and allow list (308), producing two dynamic lists: a deny list of URLs deemed malicious, such as those linked to botnets, and an allow list of safe URLs, like verified corporate domains, which could be stored in a high-speed Redis database for rapid updates and retrieval.

The sequence continues with Generative AI System sends deny list and allow list to Firewall (310), where these lists are transmitted to the Firewall, perhaps via a secure RESTful API call, enabling the Firewall to integrate this intelligence into its operations. The Firewall then updates rule set with deny list and allow list rules (312), modifying its rule set to block traffic from the deny list—specifying IPs and ports to deny—and permit traffic from the allow list, a process that might involve pushing rules to a hardware firewall like a Juniper SRX device via its management interface.

The flow proceeds to Firewall monitors network traffic for anomalies (314), where the Firewall continuously observes the incoming packet stream for irregularities, such as sudden spikes in packet rates or unusual connection attempts, using integrated tools like a network sniffer that logs metrics in real-time. If anomalies are detected, the sequence moves to Firewall detects DDoS attack and traces sources (316), where the Firewall identifies a distributed denial-of-service attack by comparing traffic metrics against a threshold—for example, 20,000 packets per second from a single IP—and traces the originating addresses using techniques like packet header analysis or traceroute, potentially executed within a custom C script.

The Firewall then generates and applies DDoS blocking rules to rule set (318), creating specific rules to block traffic from these sources—such as denying entire IP ranges—and applying them immediately to halt the attack's impact, a step that could use an automated script interfacing with iptables. Next, the Firewall queues packets for processing and sends to Quantum Firewall (320), organizing incoming packets into a queue and forwarding them to the Quantum Firewall for advanced analysis, possibly via a message queue system like RabbitMQ that ensures efficient packet distribution.

The sequence advances to Quantum Firewall inspects packets using quantum processor (322), where the Quantum Firewall employs a quantum processor to examine packet contents at a quantum level, detecting subtle threats like encrypted malware signatures that classical systems might miss, potentially using a quantum computing platform like IBM's Q System One. The Quantum Firewall generates quantum rules based on inspection (324), producing rules to allow or deny packets based on quantum analysis outcomes, such as anomalies in quantum states, which might be encoded as quantum circuit instructions.

The Quantum Firewall then sends quantum rules to Firewall, transmitting these rules back to the Firewall, perhaps through a secure internal network protocol, enabling broader application across the system. The Firewall prioritizes quantum rules in rule set (326), ensuring these quantum-derived rules take precedence over conventional ones, a configuration adjustment that could be set within the Firewall's rule engine to enhance security precision.

In parallel, the flow includes Firewall sends packets to Doppelganger System for simulation (328), where the Firewall forwards the queued packets to the Doppelganger System for preemptive testing, possibly via a high-speed internal bus. The Doppelganger System mirrors network state in real-time (330), replicating the network's current configuration and traffic conditions in a virtual environment, which might be achieved using a virtualization tool like VMware with real-time data synchronization over WebSockets.

The Doppelganger System then simulates packet effects with quantum simulator (332), modeling how each packet would affect the mirrored network using a quantum simulator, a process that could leverage Qon Microsoft Azure Quantum to test packet interactions under various conditions. The Doppelganger System evaluates multiple scenarios and determines outcomes (334), assessing different potential impacts—like packet denial or rerouting—for each simulation, potentially using a custom simulation engine written in C++ to run parallel scenarios and output decisions.

The Doppelganger System sends simulation outcomes to Firewall (336), delivering these allow-or-deny decisions back to the Firewall, perhaps as structured JSON messages over a secure channel. The Firewall applies simulation outcomes to rule set (338), updating its rules to reflect the simulation results, integrating them alongside quantum rules, a step that might involve an API call to the Firewall's rule management system.

Concurrently, the sequence includes Firewall requests quantum key generation from Quantum Key Distribution System (340), where the Firewall initiates secure communication by requesting a quantum key, possibly via an encrypted command over an internal network. The Quantum Key Distribution System emits photons and measures polarization (342), generating a quantum key by emitting photons—for example, at a wavelength of 1550 nm—and measuring their polarization states, a process that could use hardware like Toshiba's quantum key distribution setup with avalanche photodiodes.

The Quantum Key Distribution System generates and stores quantum key (344), creating a secure key from these measurements and storing it in a protected memory enclave, aligning with a secure storage solution like Intel SGX. The Quantum Key Distribution System sends quantum key to Firewall (346), transmitting the key to the Firewall, perhaps over a dedicated fiber optic link, enabling traffic validation.

The Firewall validates network traffic using quantum key (348), authenticating incoming packets by comparing their embedded keys against the quantum key, a validation process that could be implemented as a C-based protocol handler within the Firewall. The Quantum Key Distribution System analyzes polarization for eavesdropping (350), checking photon polarization for disturbances that indicate interference, potentially using quantum state tomography executed on a dedicated microcontroller.

If disturbances are found, the Quantum Key Distribution System detects interference and notifies Firewall (352), identifying compromised transmission paths and alerting the Firewall, a notification that might be a high-priority message over a secure socket. The Firewall blocks traffic from interfered path and reroutes to alternative path (354), updating its rule set to deny traffic from the affected path and redirecting it to a safe route, possibly using BGP routing adjustments automated via a Python script.

The sequence continues with Firewall adjusts rule set update frequency based on threat level (356), increasing the frequency of rule updates—say, from hourly to every minute—during heightened risk periods, a dynamic adjustment that could be a Bash scheduler integrated into the Firewall's control logic. The Firewall analyzes historical traffic data for threat prediction (358), examining past traffic logs to forecast future threats, using a time-series analysis tool like R to identify patterns that might preempt attacks.

The Firewall updates rule set preemptively based on predictions (360), proactively adjusting rules before threats emerge, a step that could involve an automated rule generator script pushing predictive rules to the Firewall. The Doppelganger System synchronizes simulation results with Generative AI System (362), feeding simulation outcomes back to refine the AI's predictive model, potentially via an Apache Airflow workflow syncing JSON—formatted results hourly.

The Generative AI System updates predictive model with simulation feedback (364), incorporating these insights to enhance its threat detection accuracy, a process that might update a subset of the model's weights using a custom training script. The Quantum Key Distribution System encrypts internal communications with quantum key (366), securing node-to-node data within the network using the quantum key, which could be implemented via OpenVPN configured with quantum-derived encryption keys.

The sequence nears completion with Firewall forwards validated traffic to Network Traffic Source (368), releasing authenticated and safe packets back to the Network Traffic Source, ensuring secure connectivity, a step that might be a standard routing action within the Firewall. Finally, the Network Administrator receives security status report from Firewall (370), where the Firewall compiles and sends a detailed report—covering threat detections, rule updates, and system status—to the Network Administrator, potentially as a PDF generated by a reporting tool like JasperReports, delivered via email or a dashboard interface, providing human oversight and control.

This FIG. 3 sequence diagram intricately maps the collaborative interactions among the actors, detailing every step from traffic reception to threat mitigation and secure communication, showcasing the invention's comprehensive approach to network security through AI-driven analysis, quantum-enhanced processing, and real-time simulation, with each interaction expanded to reflect its operational significance and technical depth.

The class diagram of FIG. 4 represents a structured object-oriented blueprint of a network security framework that integrates generative artificial intelligence, dynamic firewall management, quantum processing, simulation, and quantum key distribution, encapsulating sample functionalities, processes, steps, components, and elements as delineated in the system specifications, method specifications, and pseudocode. This diagram delineates seven distinct classes—Network Manager (400), Generative AI System (402), Firewall (404), Quantum Firewall (406), Doppelganger System (408), Quantum Key Distribution System (410), and Traffic Processor (412)—each with specific attributes and methods that collectively orchestrate the invention's comprehensive security operations. These classes are interconnected through a web of relationships that reflect the flow of data, control, and interactions necessary to protect a network from diverse threats, providing a detailed and expandable foundation for implementation in a programming environment like Java or Python.

The Network Manager (400) class serves as the central orchestrator of the entire security system, overseeing and coordinating the activities of all other components to ensure cohesive operation. Its attributes include trafficStatus: String, which holds the current state of network traffic (e.g., "normal," "under attack"), ruleSet: List<Rule>, a collection of security rules applied across the system, threatLevel: Integer, a numerical indicator of current risk (e.g., 1-10), and historicalData: List<TrafficLog>, an archive of past traffic logs for predictive analysis. The methods of Network Manager (400) are initializeSystem( ): void, which starts the security process akin to the pseudocode's initializeSecuritySystem function by setting up all subsystems; updateRuleSet(rules: List<Rule>): void, which refreshes the rule set with new rules from various sources; monitorTraffic( ): TrafficStatus, which continuously tracks network activity; adjustUpdateFrequency(level: Integer): void, aligning with method specifications to dynamically adjust rule update intervals based on threat levels; and predictThreats( ): List<PredictedThreat>, which forecasts potential risks using historical data, mirroring the analyze historical traffic data step. This class could be implemented as a singleton in Java, managing system-wide coordination from a central server, with connections to all other classes via has-a relationships, reflecting its role as the system's overseer.

The Generative AI System (402) class embodies the AI-driven threat detection core, responsible for scanning and analyzing internet data to identify malicious URLs. Its attributes are model: PredictiveModel, representing the AI's predictive engine; denyList: List<URL>, a list of URLs to block; allowList: List<URL>, a list of safe URLs; and internetData: DataSet, the raw data collected for analysis. The methods include collectInternetData( ): DataSet, which gathers data from the web as in the collect internet data continuously step; preprocessData(data: DataSet): DataSet, transforming raw data into a structured format; analyzeData (data: DataSet): List<ThreatPattern>, detecting threat patterns per the analyze preprocessed data step; identifyMaliciousURLs(patterns: List<ThreatPattern>): List<URL>, pinpointing malicious URLs; updateModel(feedback: Feedback): void, refining the model with feedback as in the pseudocode's updateModelWithFeedback; and generateLists(urls: List<URL>): void, creating deny and allow lists per method specifications. This class might be realized in Python using TensorFlow for the model, with Redis for list storage, and connects to Firewall (404) to send lists and receives feedback from Doppelganger System (408) to enhance its predictions.

The Firewall (404) class is the primary traffic regulator, managing the rule set and handling network packets. Its attributes include ruleSet: List<Rule>, the active security policies; trafficQueue: Queue<Packet>, a queue of packets awaiting processing; anomalyThreshold: Integer, a limit for detecting anomalies (e.g., 10,000 packets/second); and ddosSources: List<IPAddress>, tracked DDoS origins. The methods are updateRuleSet(rules: List<Rule>): void, applying rules from multiple sources; monitorTraffic( ): TrafficStatus, observing traffic flow; detectDDoS(status: TrafficStatus): Boolean, identifying DDoS attacks per the detect distributed denial-of-service attack step; traceDDoSSources( ): List<IPAddress>, locating attack origins; generateDDoSRules(sources: List<IPAddress>): List<Rule>, creating blocking rules; queuePackets(packets: List<Packet>): void, organizing packets for processing; forwardTraffic (packets: List<Packet>): void, releasing safe packets; and rerouteTraffic(path: NetworkPath): void, redirecting traffic per method specifications. Implemented as a C++ class, it might interface with a hardware firewall like Cisco ASA, receiving rules from Generative AI System (402), Quantum Firewall (406), and Doppelganger System (408), sending packets to them for analysis, and forwarding traffic to Traffic Processor (412).

The Quantum Firewall (406) class enhances security with quantum processing, focusing on packet inspection. Its attributes are quantumProcessor: QuantumProcessor, the quantum hardware; and quantumRules: List<QuantumRule>, rules derived from quantum analysis. The methods include inspectPackets(packets: List<Packet>): QuantumAnalysis, analyzing packets with quantum techniques per the inspect packets using quantum processor step; and generateQuantumRules(analysis: QuantumAnalysis): List<QuantumRule>, producing rules as in the pseudocode's processPacketsWithQuantumFirewall. This class, potentially coded in Qiskit for Python, receives packets from Firewall (404) and sends quantum rules back, leveraging quantum computing power for deep packet analysis, such as detecting quantum-level anomalies in encrypted traffic.

The Doppelganger System (408) class provides a simulation environment to test packet effects preemptively. Its attributes are mirroredNetwork: NetworkState, a virtual network replica; quantumSimulator: QuantumSimulator, the simulation engine; and simulationOutcomes: List<SimulationOutcome>, the results of simulations. The methods are mirrorNetworkState(state: NetworkState): void, syncing the network state in real-time per method specifications; simulatePackets(packets: List<Packet>): List<SimulationResult>, modeling packet impacts as in the simulatePacketProcessing pseudocode; and evaluateScenarios(results: List<SimulationResult>): List<Simul- ation-Outcome>, assessing multiple outcomes per the evaluate multiple scenarios step. Implemented in C with a VMware backend, it receives packets from Firewall (404), sends outcomes back, and synchronizes results with Generative AI System (402), offering a virtual testing ground that mirrors the doppelganger system's unique functionality.

The Quantum Key Distribution System (410) class secures communications with quantum cryptography. Its attributes include photonGenerator: PhotonGenerator, the photon source; polarizationDetector: PolarizationDetector, the measurement device; quantumKey: QuantumKey, the generated key; and keyStore: KeyStore, secure storage. The methods are emitPhotons( ): PhotonStream, producing photons per the emit photons step; measurePolarization(stream: PhotonStream): QuantumKey, creating keys as in the pseudocode's generateQuantumKey; storeKey(key: QuantumKey): void, saving keys; validateTraffic(key: QuantumKey, packetKey: PacketKey): Boolean, authenticating packets; detectEavesdropping(stream: PhotonStream): Boolean, identifying interference per the detect eavesdropping step; and encryptCommunications(key: QuantumKey, data: NetworkData): EncryptedData, securing internal data. Coded in C with quantum hardware interfaces, it receives requests from Firewall (404) and sends keys back, ensuring secure validation and encryption.

The Traffic Processor (412) class manages packet flow post-validation. Its attributes are packetQueue: Queue<Packet>, queued packets; and validatedTraffic: List<Packet>, processed packets. The methods include queuePackets(packets: List<Packet>): void, organizing packets; and processTraffic( ): List<Packet>, handling validated traffic per the forward validated traffic step. Implemented in Java with a RabbitMQ backend, it receives traffic from Firewall (404), finalizing the flow by processing and releasing safe packets.

The interconnections depict a robust system: Network Manager (400) has-a relationships with all classes, acting as the coordinator; Generative AI System (402) sends lists to Firewall (404) and receives feedback from Doppelganger System (408); Firewall (404) integrates rules from multiple sources, sends packets for analysis, and forwards traffic to Traffic Processor (412); Quantum Firewall (406) and Doppelganger System (408) process packets and return results to Firewall (404); Quantum Key Distribution System (410) provides keys to Firewall (404); and Traffic Processor (412) finalizes traffic flow. This FIG. 4 class diagram offers a detailed, expandable structure, reflecting the invention's comprehensive security approach with AI, quantum technology, and simulation, grounded in the specifications and pseudocode.

Pseudocode exemplars for implementing various aspects of this disclosure are set forth below with explanations for reference.

```
// Generative AI for URL Scanning and List Generation
function initializeGenerativeAI( ):
    model = loadPretrainedModel("generative_ai_model")
    internetScanner = initializeInternetScanner( )
    urlDatabase = createEmptyDatabase( )
    return model, internetScanner, urlDatabase
function scanInternetForMaliciousURLs(model, internetScanner, urlDatabase):
    while true:
        rawData = internetScanner.collectInternetData( )
        processedData = preprocessData(rawData)
        potentialThreats = model.predict(processedData)
        for url in potentialThreats:
            if url.confidenceScore > THRESHOLD:
                urlDatabase.add(url, "potential_malicious")
        updateModelWithFeedback(model, urlDatabase)
        sleep(SCAN_INTERVAL)
function generateDynamicLists(urlDatabase):
    allowList = createEmptyList( )
    denyList = createEmptyList( )
    for url in urlDatabase:
        if url.status == "potential_malicious":
            denyList.append(url)
        else:
            allowList.append(url)
    return allowList, denyList
// Dynamic Firewall Rule Management
function initializeFirewall( ):
    firewall = createFirewallInstance( )
    ruleSet = createEmptyRuleSet( )
    return firewall, ruleSet
function updateFirewallRules(firewall, ruleSet, allowList, denyList):
    ruleSet.clear( )
    for url in allowList:
        rule = createRule("allow", url.ipAddress, url.port)
        ruleSet.add(rule)
    for url in denyList:
        rule = createRule("deny", url.ipAddress, url.port)
        ruleSet.add(rule)
    firewall.applyRules(ruleSet)
function monitorTrafficForDDOS(firewall):
    trafficAnalyzer = initializeTrafficAnalyzer( )
    while true:
        trafficData = firewall.captureTraffic( )
        anomalyScore = trafficAnalyzer.analyze(trafficData)
        if anomalyScore > DDOS_THRESHOLD:
            sources = traceDDoSSources(trafficData)
            for source in sources:
                rule = createRule("deny", source.ipAddress, source.port)
            ruleSet.add(rule)
        firewall.applyRules(ruleSet)
    sleep(MONITOR_INTERVAL)
// Quantum Firewall Integration
function initializeQuantumFirewall( ):
    quantumProcessor = activateQuantumProcessor( )
    quantumRuleSet = createEmptyQuantumRuleSet( )
    return quantumProcessor, quantumRuleSet
function processPacketsWithQuantumFirewall(quantumProcessor, quantumRuleSet,
packetQueue):
    while true:
        packet = packetQueue.dequeue( )
        quantumResult = quantumProcessor.inspectPacket(packet)
```

-continued

```
        if quantumResult.isMalicious:
            rule = createQuantumRule("deny", packet.source, packet.destination)
        else:
            rule = createQuantumRule("allow", packet.source, packet.destination)
        quantumRuleSet.add(rule)
        applyQuantumRules(quantumRuleSet)
// Duplicate Doppelganger System
function initializeDoppelgangerSystem( ):
    doppelgangerNetwork = createNetworkMirror( )
    quantumSimulator = initializeQuantumSimulator( )
    return doppelgangerNetwork, quantumSimulator
function
simulatePacketProcessing(doppelgangerNetwork, quantumSimulator,
packet):
    doppelgangerNetwork.loadState(mainNetwork.getState( ))
    simulationResult = quantumSimulator.runSimulation(doppelgangerNetwork,
packet)
    if simulationResult.isSafe:
        return "allow"
    else:
        return "deny"
function processTrafficWithDoppelganger(firewall, doppelgangerNetwork,
quantumSimulator, packetQueue):
    while true:
        packet = packetQueue.dequeue( )
        decision = simulatePacketProcessing(doppelgangerNetwork, quantumSimulator,
packet)
        if decision == "allow":
            firewall.forwardPacket(packet)
        else:
            rule = createRule("deny", packet.source, packet.destination)
            firewall.ruleSet.add(rule)
            firewall.applyRules(ruleSet)
// Quantum Key Distribution with Photon Polarization
function initializeQuantumKeyDistribution( ):
    photonGenerator = activatePhotonGenerator( )
    polarizationDetector = initializePolarizationDetector( )
    keyStore = createEmptyKeyStore( )
    return photonGenerator, polarizationDetector, keyStore
function generateQuantumKey(photonGenerator, polarizationDetector):
    photonStream = photonGenerator.emitPhotons(PHOTON_COUNT)
    polarizedKey = polarizationDetector.measurePolarization(photonStream)
    return polarizedKey
function validateTrafficWithQuantumKey(firewall, photonGenerator,
polarizationDetector, keyStore, packet):
    senderKey = packet.getQuantumKey( )
    localKey = generateQuantumKey(photonGenerator, polarizationDetector)
    if compareKeys(senderKey, localKey):
        keyStore.store(localKey, packet.source)
        firewall.forwardPacket(packet)
    else:
        rule = createRule("deny", packet.source, packet.destination)
        firewall.ruleSet.add(rule)
        firewall.applyRules(ruleSet)
function detectEavesdropping(photonGenerator, polarizationDetector, packet):
    photonStream = photonGenerator.emitPhotons(PHOTON_COUNT)
    measuredStream = polarizationDetector.measurePolarization(photonStream)
    if isPolarization Disturbed(measuredStream):
        return true
    return false
function secureCommunication WithQuantumKey(firewall, photonGenerator,
polarizationDetector, packetQueue):
    while true:
        packet = packetQueue.dequeue( )
        if detectEavesdropping(photonGenerator, polarizationDetector, packet):
            rule = createRule("deny", packet.source, packet.port)
            firewall.ruleSet.add(rule)
            firewall.applyRules(ruleSet)
        else:
            validateTrafficWithQuantumKey(firewall, photonGenerator,
polarizationDetector, keyStore, packet)
// Main System Integration
function initializeSecuritySystem( ):
    aiModel, internetScanner, urlDatabase = initializeGenerativeAI( )
    firewall, ruleSet = initializeFirewall( )
```

-continued

```
    quantumProcessor, quantumRuleSet = initializeQuantum Firewall( )
    doppelgangerNetwork, quantumSimulator = initializeDoppelgangerSystem( )
    photonGenerator, polarizationDetector, keyStore =
initializeQuantumKeyDistribution( )
    packetQueue = createPacketQueue( )
    return aiModel, internetScanner, urlDatabase, firewall, ruleSet, quantumProcessor,
quantumRuleSet, doppelgangerNetwork, quantumSimulator, photonGenerator,
polarizationDetector, keyStore, packetQueue
function runSecuritySystem(aiModel, internetScanner, urlDatabase, firewall, ruleSet,
quantumProcessor, quantumRuleSet, doppelgangerNetwork, quantumSimulator,
photonGenerator, polarizationDetector, keyStore, packetQueue):
    thread1 = startThread(scanInternetForMaliciousURLs, aiModel, internetScanner,
urlDatabase)
    thread2 = startThread(monitorTrafficForDDOS, firewall)
    thread3 = startThread(processPacketsWithQuantumFirewall, quantumProcessor,
quantumRuleSet, packetQueue)
    thread4 = startThread(processTrafficWithDoppelganger, firewall,
doppelgangerNetwork, quantumSimulator, packetQueue)
    thread5 = startThread(secureCommunicationWithQuantumKey, firewall,
photonGenerator, polarizationDetector, packetQueue)
    while true:
        allowList, denyList = generateDynamicLists(urlDatabase)
        updateFirewallRules(firewall, ruleSet, allowList, denyList)
        incomingPacket = networkInterface.receivePacket( )
        packetQueue.enqueue(incomingPacket)
        sleep(SYSTEM_CYCLE_INTERVAL)
```

The pseudocode provided outlines a comprehensive implementation of a network security system that integrates generative AI, dynamic firewall management, quantum computing, a duplicate doppelganger simulation, and quantum key distribution. It begins with the initialization of the generative AI component through a function that loads a pretrained model, sets up an internet scanner, and creates an empty database to store URL information. This function establishes the foundation for the AI-driven threat detection process by preparing the necessary tools to analyze online data and catalog potential risks.

The next segment focuses on scanning the internet for malicious URLs, where the system enters a continuous loop to gather raw data from the internet using the scanner. This data is preprocessed to make it suitable for analysis, and the AI model predicts which URLs might pose threats based on their characteristics. URLs with a confidence score exceeding a predefined threshold are added to the database as potential risks, and the model is updated with feedback from this process to improve its accuracy over time. This loop runs at regular intervals, ensuring ongoing vigilance across the digital landscape.

Following the scanning process, the pseudocode defines a function to generate dynamic lists from the URL database, creating separate collections for URLs to allow and deny. It iterates through the database, assigning URLs marked as potentially malicious to the deny list and others to the allow list. These lists serve as the basis for updating firewall rules, enabling the system to adapt its defenses based on the latest AI-generated intelligence.

The firewall management begins with an initialization function that creates a firewall instance and an empty rule set to store its configurations. This sets the stage for the rule update function, which clears the existing rule set and rebuilds it using the allow and deny lists. For each URL in these lists, it creates specific rules to either permit or block traffic based on IP addresses and ports, then applies these rules to the firewall, ensuring real-time alignment with the AI's findings.

To address large-scale network disruptions, the pseudocode includes a function to monitor traffic for DDoS attacks using a traffic analyzer. In a continuous loop, it captures traffic data from the firewall, analyzes it for anomalies, and compares the anomaly score to a threshold. If exceeded, it traces the sources of the disruptive traffic and adds deny rules for each identified source to the rule set, applying them to mitigate the attack. This process repeats at set intervals to maintain constant oversight.

The quantum firewall integration starts with an initialization function that activates a quantum processor and creates an empty rule set tailored for quantum rules. The packet processing function runs in a loop, dequeuing packets from a queue and using the quantum processor to inspect them. Based on the inspection, it generates quantum rules to allow or deny the packets, adding them to the rule set and applying them, leveraging quantum computing's speed and depth for enhanced security.

A unique feature, the doppelganger system, is initialized by creating a mirror of the main network and setting up a quantum simulator. The simulation function loads the current state of the main network into this mirror and uses the quantum simulator to model the impact of a packet, returning a decision to allow or deny it. This simulation is integrated into a traffic processing function that dequeues packets, simulates their effects, and either forwards them through the firewall if safe or adds a deny rule if not, protecting the live network by testing outcomes first.

The quantum key distribution component begins with an initialization function that activates a photon generator, polarization detector, and key store. A key generation function emits a stream of photons, measures their polarization to create a quantum key, and returns it for use in securing communications. The traffic validation function extracts a quantum key from a packet, generates a local key, and compares them; if they match, the packet is forwarded, and the key is stored, otherwise a deny rule is applied, ensuring secure data exchange.

To detect eavesdropping, the pseudocode includes a function that emits photons, measures their polarization, and checks for disturbances indicating interference. This is incorporated into a communication security function that dequeues packets, checks for eavesdropping, and either denies traffic from disturbed sources or validates it with quantum keys, adding a layer of protection against unauthorized monitoring.

The main system integration ties all components together with an initialization function that sets up the generative AI, firewall, quantum firewall, doppelganger system, quantum key distribution, and a packet queue. The execution function launches separate threads for scanning URLs, monitoring DDoS attacks, processing packets with the quantum firewall, handling traffic with the doppelganger system, and securing communications with quantum keys, ensuring concurrent operation of all features.

In the main execution loop, the system generates dynamic lists from the URL database, updates the firewall rules accordingly, receives incoming packets from the network interface, and enqueues them for processing by the various components. This loop runs at a defined interval, orchestrating the interaction of AI-driven threat detection, dynamic rule application, quantum-enhanced analysis, simulation-based decision-making, and secure key validation.

Each function in the pseudocode is designed to operate independently yet interdependently, with data flowing seamlessly between them. The generative AI feeds URL intelligence to the firewall, which collaborates with the quantum firewall and doppelganger system to process packets, while the quantum key distribution ensures secure communication, all managed through a central queue and threaded execution for efficiency.

The use of a packet queue as a central mechanism allows the system to handle incoming traffic systematically, distributing packets to the quantum firewall, doppelganger system, and key validation processes as needed. This ensures that each packet is thoroughly evaluated—through AI analysis, quantum inspection, simulation, and cryptographic checks—before a final decision is made, maximizing security without compromising performance.

The threading approach in the main function enables parallel execution of monitoring, scanning, and processing tasks, leveraging modern computing architectures to maintain real-time responsiveness. The sleep intervals in loops like internet scanning, DDoS monitoring, and system cycling prevent resource overload while ensuring consistent operation, balancing thoroughness with efficiency.

The quantum components, such as the processor, simulator, and photon-based key distribution, rely on abstract representations of quantum computing capabilities, assuming access to such technology for rapid packet inspection, simulation, and secure key generation. These elements integrate with classical computing structures like the firewall and AI model, creating a hybrid system that combines cutting-edge and established technologies.

The doppelganger system's ability to mirror the main network and simulate packet effects provides a preemptive layer of defense, allowing the system to test scenarios without risking the live environment. Its reliance on quantum simulation ensures that these tests are both fast and comprehensive, evaluating complex outcomes that classical systems might struggle to handle.

The pseudocode's modularity allows for flexibility in implementation, where components like the quantum firewall or doppelganger system could be omitted if resources are limited, yet still retain core functionality through the AI and dynamic firewall. This adaptability makes the system scalable to different network sizes and technological capabilities.

The continuous feedback loop in the AI scanning function, where the model updates itself based on database outcomes, ensures that the system improves over time, refining its threat detection as it processes more data. This learning aspect is subtly reinforced by the doppelganger simulations, which could further inform the AI's criteria, though this interaction is implied rather than explicitly coded.

Overall, the pseudocode encapsulates a holistic security framework that dynamically scans for threats, applies real-time rules, simulates outcomes, and secures communications using advanced computational techniques. It provides a detailed blueprint for a system that operates as a cohesive unit, with each function contributing to a robust and adaptive defense mechanism for modern networks.

The systems and methods described offer a robust framework for network security that can be adapted through various alternatives, modifications, combinations, and customizations while remaining within its spirit and scope. One alternative could involve replacing the generative AI model with a different machine learning approach, such as a reinforcement learning system that adapts its threat detection based on rewards from successful identifications rather than predefined confidence thresholds. This could enhance the system's ability to evolve in response to novel threats without relying solely on pre-trained data, maintaining the focus on dynamic threat identification.

A modification to the internet scanning process might include integrating additional data sources beyond general internet traffic, such as dark web monitoring or threat intelligence feeds from external providers. This would broaden information used to generate URL lists, potentially improving accuracy and coverage while adhering to the goal of proactive defense. The scanning interval could also be customized to vary dynamically based on network load or detected threat levels, optimizing resource use without deviating from the continuous monitoring principle.

The firewall management system could be altered by incorporating a hybrid rule application strategy, where rules are applied immediately while others are queued for review by an administrator before activation. This combination preserves the real-time adaptability while adding a layer of human oversight for complex decisions, aligning intending to secure network operation. Another customization might involve adjusting the granularity of rules to target specific protocols or packet types, tailoring the system to the unique needs of different network environments.

For the DDoS monitoring function, an alternative approach could use statistical anomaly detection instead of a fixed threshold, allowing the system to adapt to baseline traffic patterns. This modification would maintain the focus on identifying and mitigating large-scale disruptions while offering flexibility for networks with fluctuating activity levels. The tracing of attack sources could be enhanced by integrating geolocation data, enabling rules that block traffic based on geographic origins, which remains consistent with the aim of precise threat neutralization.

The quantum firewall component presents opportunities for customization, such as varying the depth of packet inspection based on quantum processing resources. In scenarios with limited quantum capabilities, the system could prioritize critical packets for quantum analysis while routing others through a classical firewall, preserving the enhanced security focus. An alternative might involve using different quantum algorithms for inspection, such as quantum annealing for pattern recognition, to optimize performance within the same framework.

The doppelganger system could be modified to simulate not just individual packets but entire traffic scenarios, such as peak load conditions or multi-vector attacks. This would extend its utility for network planning and stress testing, staying true to the preemptive evaluation ethos. A combination approach might integrate the doppelganger with the generative AI, using simulation outcomes to train the AI model directly, creating a tighter feedback loop that enhances both components' effectiveness.

Customizations to the doppelganger system could include adjusting the fidelity of the network mirror, ranging from a lightweight replica for speed to a fully detailed duplicate for accuracy, depending on computational resources. An alternative might replace the quantum simulator with a classical high-performance computing cluster in environments lacking quantum hardware, ensuring the simulation capability persists within the system's protective intent.

The quantum key distribution using photon polarization could be adapted by employing alternative quantum properties, such as entanglement, for key generation, offering a different cryptographic foundation while maintaining secure communication. A modification might involve hybrid key systems that combine quantum and classical encryption for compatibility with legacy infrastructure, aligning with the goal of robust data validation.

Detection of eavesdropping could be customized to trigger different responses beyond port closure, such as rerouting traffic through a secondary encrypted channel or logging incidents for forensic analysis. This flexibility enhances the system's responsiveness to interference while staying within the scope of secure transmission. An alternative might use machine learning to analyze polarization disturbances, improving detection accuracy.

The main system integration allows for significant customization in threading and resource allocation. One modification could prioritize certain threads—such as DDoS monitoring—during high-threat periods, dynamically adjusting processing power to meet immediate needs. An alternative might consolidate functions into a single thread for simpler deployments, reducing complexity while preserving functionality.

Combinations of these components could include pairing the quantum firewall with classical DDoS detection for a hybrid security layer, leveraging quantum speed for packet analysis and statistical methods for traffic anomalies. Another combination might merge the doppelganger simulations with quantum key validation, testing cryptographic integrity within simulated environments to ensure end-to-end security.

The packet queue mechanism could be modified to implement priority queuing, where packets from trusted sources or critical applications are processed faster, optimizing performance without sacrificing security. An alternative might distribute the queue across multiple nodes in a distributed network, enhancing scalability for large systems while adhering to the centralized processing model.

The AI's feedback loop could be customized to incorporate external validation, such as cross-referencing with third-party threat databases, refining its learning process. A modification might adjust the update frequency of the AI model based on simulation results from the doppelganger, tying the two systems more closely together within the adaptive defense framework.

For environments with limited quantum resources, the system could be tailored to use quantum components selectively, such as activating the quantum firewall only during detected threats, preserving the advanced capabilities where most impactful. An alternative might simulate quantum processes classically using approximations, maintaining the conceptual approach in resource-constrained settings.

The modular architecture supports combinations like omitting the doppelganger system while retaining the generative AI and quantum key distribution, offering a leaner version suited to smaller networks. Conversely, a full-featured deployment could enhance the quantum firewall with additional quantum algorithms for deeper analysis, maximizing security in high-stakes scenarios.

Customizations might also include user interfaces for monitoring and adjusting system parameters, such as setting thresholds or reviewing simulation logs, enhancing usability while keeping the technical core intact. An alternative could integrate with existing security tools, like intrusion detection systems, to create a more comprehensive defense ecosystem within the same spirit.

The system's scalability could be modified by adding load balancing across multiple instances, allowing it to protect distributed networks with synchronized rules and simulations. A combination might pair this with cloud-based AI processing, offloading computation while maintaining local firewall control.

Another modification could involve adaptive rule expiration, where firewall rules generated by the AI or simulations have time limits, ensuring relevance without manual cleanup. This customization supports the dynamic nature of the system while preventing rule bloat.

While the present technology has been explained through what are regarded as the most practical and preferred embodiments, these specifics are provided solely for illustrative purposes, and the disclosure is not confined to the particular descriptions and embodiments outlined. Instead, it is intended to encompass modifications and comparable arrangements that fall within the spirit and scope of the appended claims. For instance, it is understood that the present technology envisions the possibility of integrating, where feasible, one or more elements from any embodiment with one or more elements from any other embodiment.

The invention claimed is:

1. A method for securing a network, the method comprising:

scanning, by a generative artificial intelligence (AI) system, internet data to identify potential malicious uniform resource locators (URLs), wherein the generative AI system continuously collects and analyzes the internet data to detect patterns indicative of threats;

generating, by the generative AI system, a deny list containing the potential malicious URLs identified from the internet data, wherein the deny list is updated dynamically based on ongoing scanning;

updating, by a firewall, a rule set with rules derived from the deny list, wherein the firewall applies the rule set to block network traffic associated with the potential malicious URLs;

monitoring, by the firewall, the network traffic to detect a distributed denial-of-service (DDoS) attack, wherein the firewall analyzes the network traffic for anomalies exceeding a predefined threshold;

tracing, by the firewall, sources of the DDoS attack upon detection, wherein the firewall identifies originating addresses of disruptive traffic;

generating, by the firewall, additional rules to block the sources of the DDoS attack, wherein the firewall updates the rule set with the additional rules;

inspecting, by a quantum firewall, packets of the network traffic using a quantum processor, wherein the quantum firewall generates quantum rules based on quantum analysis of the packets;

simulating, by a doppelganger system, effects of the packets on a mirrored network using a quantum simulator, wherein the doppelganger system mirrors a state of the network and determines whether to allow or deny the packets based on simulation outcomes;

applying, by the firewall, the quantum rules and simulation outcomes to the rule set, wherein the firewall integrates results from the quantum firewall and the doppelganger system to regulate the network traffic;

generating, by a quantum key distribution system, a quantum key using photon polarization, wherein the quantum key distribution system emits photons and measures their polarization to create the quantum key;

validating, by the quantum key distribution system, the network traffic using the quantum key, wherein the quantum key distribution system compares the quantum key with a key from the packets to authenticate the network traffic;

detecting, by the quantum key distribution system, eavesdropping on the network traffic by analyzing disturbances in the photon polarization, wherein the quantum key distribution system identifies interference in a transmission path; and adjusting, by the firewall, the rule set based on the eavesdropping detection, wherein the firewall blocks traffic from the transmission path upon identifying the interference.

2. The method of claim 1, further comprising preprocessing, by the generative AI system, the internet data before identifying the potential malicious URLs, wherein the generative AI system transforms raw data into a format suitable for analysis.

3. The method of claim 2, further comprising updating, by the generative AI system, its predictive model with feedback from the deny list, wherein the generative AI system refines its detection patterns based on prior identifications.

4. The method of claim 3, further comprising generating, by the generative AI system, an allow list containing URLs deemed non-malicious, wherein the firewall updates the rule set to permit traffic from the allow list.

5. The method of claim 4, further comprising prioritizing, by the firewall, the quantum rules over conventional rules in the rule set, wherein the firewall applies the quantum rules generated by the quantum firewall before other rules.

6. The method of claim 5, further comprising mirroring, by the doppelganger system, the state of the network in real time, wherein the doppelganger system continuously synchronizes with the network to reflect current conditions.

7. The method of claim 6, further comprising simulating, by the doppelganger system, multiple scenarios for each packet, wherein the doppelganger system evaluates a range of potential outcomes using the quantum simulator.

8. The method of claim 7, further comprising storing, by the quantum key distribution system, the quantum key in a key store, wherein the quantum key distribution system retrieves the quantum key for subsequent validations.

9. The method of claim 8, further comprising rerouting, by the firewall, the network traffic upon detecting the eavesdropping, wherein the firewall redirects the network traffic to an alternative path free of interference.

10. The method of claim 9, further comprising adjusting, by the firewall, a frequency of the updating of the rule set based on a threat level, wherein the firewall increases the frequency during periods of heightened risk.

11. A method for securing a network, the method comprising:

scanning, by a generative artificial intelligence (AI) system, internet data to identify potential malicious uniform resource locators (URLs), wherein the generative AI system continuously collects and analyzes the internet data to detect patterns indicative of threats;

preprocessing, by the generative AI system, the internet data before identifying the potential malicious URLs, wherein the generative AI system transforms raw data into a format suitable for analysis;

generating, by the generative AI system, a deny list containing the potential malicious URLs identified from the internet data and an allow list containing URLs deemed non-malicious, wherein the deny list and the allow list are updated dynamically based on ongoing scanning;

updating, by the generative AI system, its predictive model with feedback from the deny list, wherein the generative AI system refines its detection patterns based on prior identifications;

updating, by a firewall, a rule set with rules derived from the deny list and the allow list, wherein the firewall applies the rule set to block network traffic associated with the potential malicious URLs and permit traffic from the allow list;

monitoring, by the firewall, the network traffic to detect a distributed denial-of-service (DDoS) attack, wherein the firewall analyzes the network traffic for anomalies exceeding a predefined threshold;

tracing, by the firewall, sources of the DDoS attack upon detection, wherein the firewall identifies originating addresses of disruptive traffic;

generating, by the firewall, additional rules to block the sources of the DDoS attack, wherein the firewall updates the rule set with the additional rules;

inspecting, by a quantum firewall, packets of the network traffic using a quantum processor, wherein the quantum firewall generates quantum rules based on quantum analysis of the packets;

prioritizing, by the firewall, the quantum rules over conventional rules in the rule set, wherein the firewall applies the quantum rules generated by the quantum firewall before other rules;

simulating, by a doppelganger system, effects of the packets on a mirrored network using a quantum simulator, wherein the doppelganger system mirrors a state of the network and determines whether to allow or deny the packets based on simulation outcomes;

mirroring, by the doppelganger system, the state of the network in real time, wherein the doppelganger system continuously synchronizes with the network to reflect current conditions;

simulating, by the doppelganger system, multiple scenarios for each packet, wherein the doppelganger system evaluates a range of potential outcomes using the quantum simulator;

applying, by the firewall, the quantum rules and simulation outcomes to the rule set, wherein the firewall integrates results from the quantum firewall and the doppelganger system to regulate the network traffic;

generating, by a quantum key distribution system, a quantum key using photon polarization, wherein the quantum key distribution system emits photons and measures their polarization to create the quantum key;

validating, by the quantum key distribution system, the network traffic using the quantum key, wherein the quantum key distribution system compares the quantum key with a key from the packets to authenticate the network traffic;

storing, by the quantum key distribution system, the quantum key in a key store, wherein the quantum key distribution system retrieves the quantum key for subsequent validations;

detecting, by the quantum key distribution system, eavesdropping on the network traffic by analyzing disturbances in the photon polarization, wherein the quantum key distribution system identifies interference in a transmission path;

adjusting, by the firewall, the rule set based on the eavesdropping detection, wherein the firewall blocks traffic from the transmission path upon identifying the interference;

rerouting, by the firewall, the network traffic upon detecting the eavesdropping, wherein the firewall redirects the network traffic to an alternative path free of interference;

adjusting, by the firewall, a frequency of the updating of the rule set based on a threat level, wherein the firewall increases the frequency during periods of heightened risk;

analyzing, by the firewall, historical traffic data to predict future threats, wherein the firewall uses patterns from past network traffic to preemptively update the rule set;

synchronizing, by the doppelganger system, simulation results with the generative AI system, wherein the doppelganger system provides feedback to refine the predictive model of the generative AI system; and encrypting, by the quantum key distribution system, internal network communications using the quantum key, wherein the quantum key distribution system secures data between network nodes.

12. A system for securing a network, the system comprising:

a generative artificial intelligence (AI) system configured to scan internet data to identify potential malicious uniform resource locators (URLs), wherein the generative AI system continuously collects and analyzes the internet data to detect patterns indicative of threats;

the generative AI system further configured to generate a deny list containing the potential malicious URLs identified from the internet data, wherein the generative AI system updates the deny list dynamically based on ongoing scanning;

a firewall configured to update a rule set with rules derived from the deny list, wherein the firewall applies the rule set to block network traffic associated with the potential malicious URLs;

the firewall further configured to monitor the network traffic to detect a distributed denial-of-service (DDoS) attack, wherein the firewall analyzes the network traffic for anomalies exceeding a predefined threshold;

the firewall further configured to trace sources of the DDoS attack upon detection, wherein the firewall identifies originating addresses of disruptive traffic;

the firewall further configured to generate additional rules to block the sources of the DDoS attack, wherein the firewall updates the rule set with the additional rules;

a quantum firewall, including a quantum processor, configured to inspect packets of the network traffic, wherein the quantum firewall generates quantum rules based on quantum analysis of the packets performed by the quantum processor;

a doppelganger system, including a mirrored network and a quantum simulator, configured to simulate effects of the packets on the mirrored network, wherein the doppelganger system mirrors a state of the network and determines whether to allow or deny the packets based on simulation outcomes produced by the quantum simulator;

the firewall further configured to apply the quantum rules and the simulation outcomes to the rule set, wherein the firewall integrates results from the quantum firewall and the doppelganger system to regulate the network traffic;

a quantum key distribution system, including a photon generator and a polarization detector, configured to generate a quantum key using photon polarization, wherein the quantum key distribution system emits photons via the photon generator and measures their polarization via the polarization detector to create the quantum key;

the quantum key distribution system further configured to validate the network traffic using the quantum key, wherein the quantum key distribution system compares the quantum key with a key from the packets to authenticate the network traffic;

the quantum key distribution system further configured to detect eavesdropping on the network traffic by analyzing disturbances in the photon polarization, wherein the quantum key distribution system identifies interference in a transmission path through the polarization detector; and the firewall further configured to adjust the rule set based on the eavesdropping detection, wherein the firewall blocks traffic from the transmission path upon the quantum key distribution system identifying the interference.

13. The system of claim 12, wherein the generative AI system is further configured to preprocess the internet data before identifying the potential malicious URLs, wherein the generative AI system transforms raw data into a format suitable for analysis.

14. The system of claim 13, wherein the generative AI system is further configured to update its predictive model with feedback from the deny list, wherein the generative AI system refines its detection patterns based on prior identifications.

15. The system of claim 14, wherein the generative AI system is further configured to generate an allow list containing URLs deemed non-malicious, wherein the firewall updates the rule set to permit traffic from the allow list.

16. The system of claim 15, wherein the firewall is further configured to prioritize the quantum rules over conventional rules in the rule set, wherein the firewall applies the quantum rules generated by the quantum firewall before other rules.

17. The system of claim 16, wherein the doppelganger system is further configured to mirror the state of the network in real time, wherein the doppelganger system continuously synchronizes with the network to reflect current conditions.

18. The system of claim 17, wherein the doppelganger system is further configured to simulate multiple scenarios for each packet, wherein the doppelganger system evaluates a range of potential outcomes using the quantum simulator.

19. The system of claim 18, wherein the quantum key distribution system is further configured to store the quantum key in a key store, wherein the quantum key distribution system retrieves the quantum key for subsequent validations.

20. The system of claim 19, wherein:

the firewall is further configured to reroute the network traffic upon the quantum key distribution system detecting the eavesdropping, wherein the firewall redirects the network traffic to an alternative path free of interference;

the firewall is further configured to adjust a frequency of updating the rule set based on a threat level detected in the network traffic, wherein the firewall increases the frequency during periods of heightened risk identified by the generative AI system or the quantum firewall;

the doppelganger system is further configured to provide simulation feedback to the generative AI system, wherein the doppelganger system transmits outcomes of the simulation to refine the predictive model of the generative AI system;

the quantum key distribution system is further configured to encrypt internal communications within the network using the quantum key, wherein the quantum key distribution system applies the quantum key to secure data transmitted between nodes of the network; and the firewall is further configured to log historical traffic data and analyze the historical traffic data to predict future threats, wherein the firewall uses patterns from the historical traffic data to preemptively adjust the rule set before threats materialize.

* * * * *